US011507528B2

(12) United States Patent
Das Sharma

(10) Patent No.: US 11,507,528 B2
(45) Date of Patent: Nov. 22, 2022

(54) POOLED MEMORY ADDRESS TRANSLATION

(71) Applicant: Intel Corporation, Santa Clara, CA (US)

(72) Inventor: Debendra Das Sharma, Saratoga, CA (US)

(73) Assignee: Intel Corporation, Santa Clara, CA (US)

(*) Notice: Subject to any disclaimer, the term of this patent is extended or adjusted under 35 U.S.C. 154(b) by 34 days.

(21) Appl. No.: 17/132,132

(22) Filed: Dec. 23, 2020

(65) Prior Publication Data
US 2021/0109879 A1    Apr. 15, 2021

Related U.S. Application Data

(63) Continuation of application No. 15/949,046, filed on Apr. 9, 2018, now Pat. No. 10,877,916, which is a (Continued)

(51) Int. Cl.
*G06F 13/40* (2006.01)
*G06F 12/1072* (2016.01)
(Continued)

(52) U.S. Cl.
CPC ........ *G06F 13/404* (2013.01); *G06F 12/1072* (2013.01); *G06F 13/1663* (2013.01); (Continued)

(58) Field of Classification Search
CPC ...... G06F 13/4282; G06F 3/067; G06F 13/42; G06F 13/1663; G06F 2213/0026; G06F 12/084; G06F 2212/1016
See application file for complete search history.

(56) References Cited

U.S. PATENT DOCUMENTS 6,449,700 B2    9/2002  Hagersten et al.
9,442,836 B2 *  9/2016  Yamamura .......... G06F 12/1027
(Continued)

FOREIGN PATENT DOCUMENTS

TW    201241626 A    10/2012
WO    1999012102     3/1999
(Continued)

OTHER PUBLICATIONS

EPO; Extended European Search Report issued in EP Patent Application No. 21170295.6, dated Aug. 18, 2021; 5 pages.
(Continued)

*Primary Examiner* — Idriss N Alrobaye
*Assistant Examiner* — Richard B Franklin
(74) *Attorney, Agent, or Firm* — Alliance IP, LLC

(57) ABSTRACT

A shared memory controller receives, from a computing node, a request associated with a memory transaction involving a particular line in a memory pool. The request includes a node address according to an address map of the computing node. An address translation structure is used to translate the first address into a corresponding second address according to a global address map for the memory pool, and the shared memory controller determines that a particular one of a plurality of shared memory controllers is associated with the second address in the global address map and causes the particular shared memory controller to handle the request.

13 Claims, 20 Drawing Sheets

Related U.S. Application Data continuation of application No. 14/671,566, filed on Mar. 27, 2015, now Pat. No. 9,940,287.

(51) Int. Cl.
*G06F 13/42* (2006.01)
*G06F 15/167* (2006.01)
*G06F 13/16* (2006.01)

(52) U.S. Cl.
CPC ...... *G06F 13/4022* (2013.01); *G06F 13/4282* (2013.01); *G06F 15/167* (2013.01); *G06F 2212/1024* (2013.01); *G06F 2212/1048* (2013.01)

(56) References Cited

U.S. PATENT DOCUMENTS

| | | | |
|---|---|---|---|
| 9,921,768 B2* | 3/2018 | Jen | G06F 13/385 |
| 10,073,808 B2* | 9/2018 | Wu | G06F 13/4022 |
| 10,915,468 B2* | 2/2021 | Das Sharma | G06F 13/4282 |
| 2003/0225938 A1 | 12/2003 | Glasco et al. | |
| 2006/0212622 A1 | 9/2006 | Porat et al. | |
| 2009/0089537 A1 | 4/2009 | Vick et al. | |
| 2010/0161912 A1 | 6/2010 | Daniel | |
| 2011/0047313 A1 | 2/2011 | Hui et al. | |
| 2012/0079156 A1 | 3/2012 | Safranek et al. | |
| 2014/0052899 A1 | 2/2014 | Nan | |
| 2014/0181359 A1 | 6/2014 | Zhang et al. | |
| 2015/0032917 A1 | 1/2015 | Nguyen | |
| 2016/0124872 A1* | 5/2016 | Shrader | G06F 13/161 710/36 |
| 2016/0283375 A1 | 9/2016 | Sharma et al. | |

FOREIGN PATENT DOCUMENTS

| | | |
|---|---|---|
| WO | 2014178854 A1 | 11/2014 |
| WO | 2015099730 A1 | 7/2015 |
| WO | 2016160200 | 11/2016 |

OTHER PUBLICATIONS

EPO Summons to Attend Oral Proceedings in European Application Serial No. 16773667.7 dated Apr. 16, 2020 (6 pages).

EPO; Office Action issued in European Patent Application No. EP 16773667.7, dated Oct. 31, 2019; 5 pages.

Extended European Search Report for Application No. EP16773667. 7, dated Oct. 26, 2018, 7 pages.

International Preliminary Report on Patentability in International Application No. PCT/US2016/019685 dated Oct. 3, 2017, 12 pages.

International Search Report and Written Opinion in International Application No. PCT/US2016/019685 dated May 30, 2016 (13 pages).

* cited by examiner

POOLED MEMORY ADDRESS TRANSLATION

CROSS-REFERENCE TO RELATED APPLICATIONS

This application is a continuation of U.S. Nonprovisional application Ser. No. 15/949,046, filed on Apr. 9, 2018, and entitled "POOLED MEMORY ADDRESS TRANSLATION," which is a continuation of U.S. Nonprovisional application Ser. No. 14/671,566, filed on Mar. 27, 2015, now U.S. Pat. No. 9,940,287, issued on Apr. 10, 2018, each of which is hereby incorporated by reference herein in its entirety.

FIELD

This disclosure pertains to computing system, and in particular (but not exclusively) to memory access between components in a computing system.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

As a result of the greater ability to fit more processing power in smaller packages, smaller computing devices have increased in popularity. Smartphones, tablets, ultrathin notebooks, and other user equipment have grown exponentially. However, these smaller devices are reliant on servers both for data storage and complex processing that exceeds the form factor. Consequently, the demand in the high-performance computing market (i.e. server space) has also increased. For instance, in modern servers, there is typically not only a single processor with multiple cores, but also multiple physical processors (also referred to as multiple sockets) to increase the computing power. But as the processing power grows along with the number of devices in a computing system, the communication between sockets and other devices becomes more critical.

In fact, interconnects have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures.

BRIEF DESCRIPTION OF THE DRAWINGS

Like reference numbers and designations in the various drawings indicate like elements.

DETAILED DESCRIPTION

Figure 1:
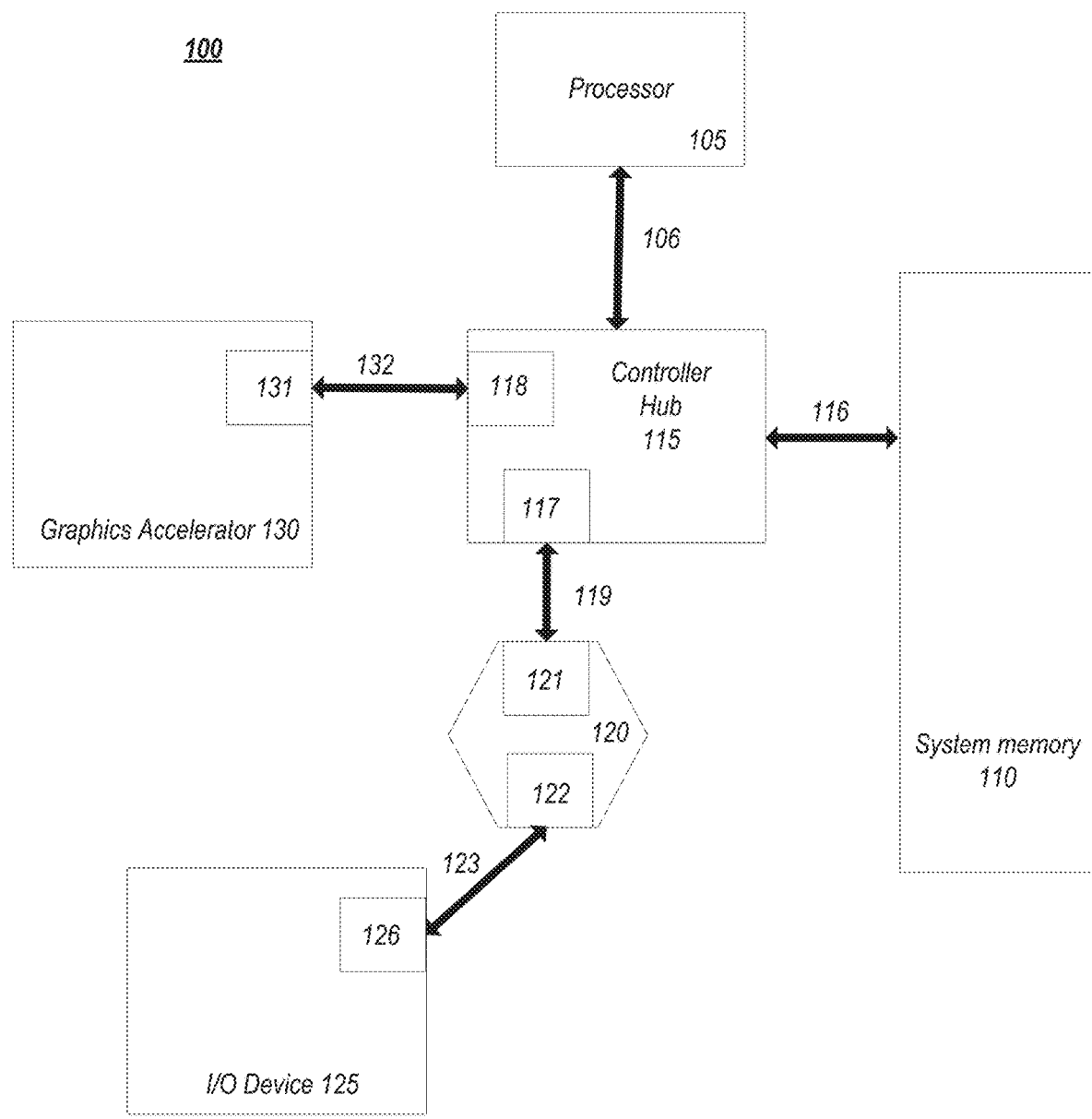
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point Links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105.

Figure 2:
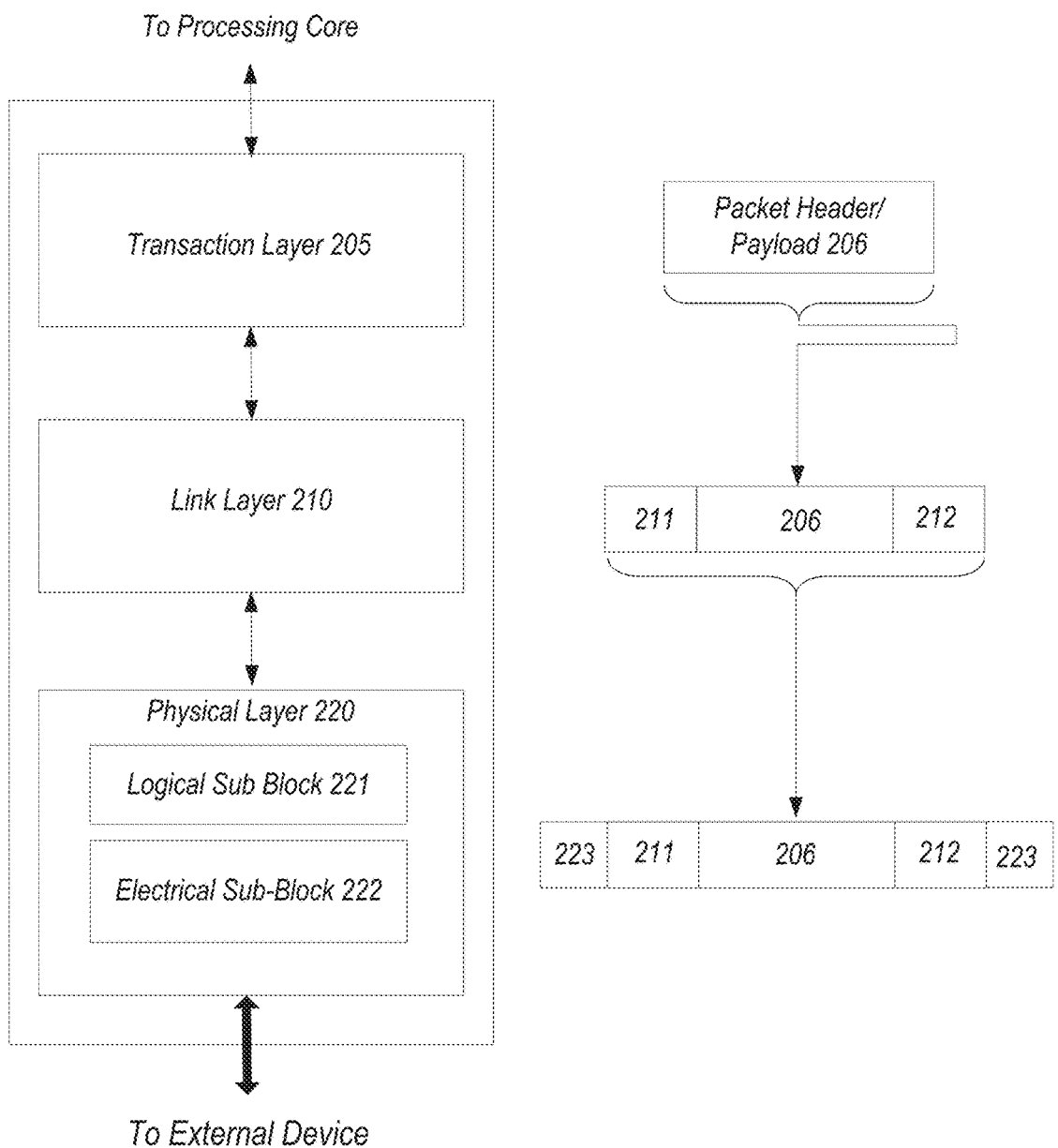
FIG. 2 illustrates an embodiment of a interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, a PCie stack, a next generation high performance computing interconnect stack, or other layered stack. Although the discussion immediately below in reference to FIGS. 1-4 are in relation to a PCIe stack, the same concepts may be applied to other interconnect stacks. In one embodiment, protocol stack 200 is a PCIe protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The transaction layer 205 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 205 assembles packet header/payload 206. Format for current packet headers/payloads may be found in the PCIe specification at the PCIe specification website.

Figure 3:
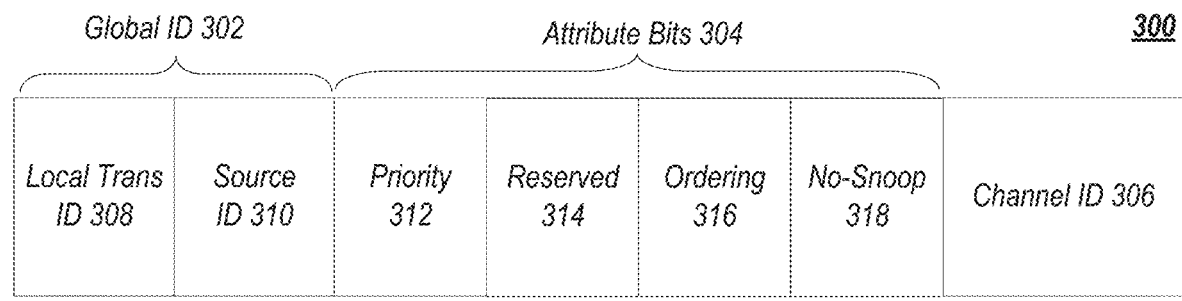
FIG. 3 illustrates an embodiment of a request or packet to be generated or received within an interconnect architecture.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 4:
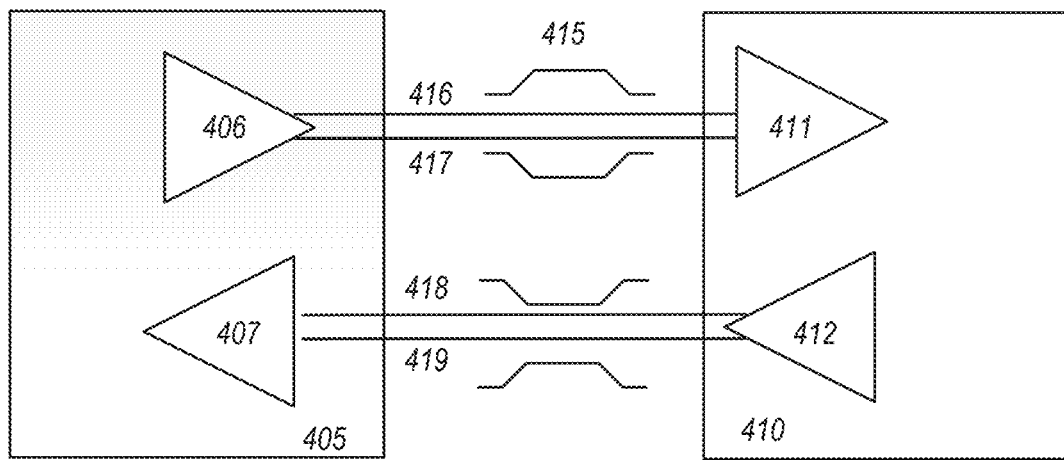
FIG. 4 illustrates an embodiment of a transmitter and receiver pair for an interconnect architecture.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 20, 24, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Figure 5:
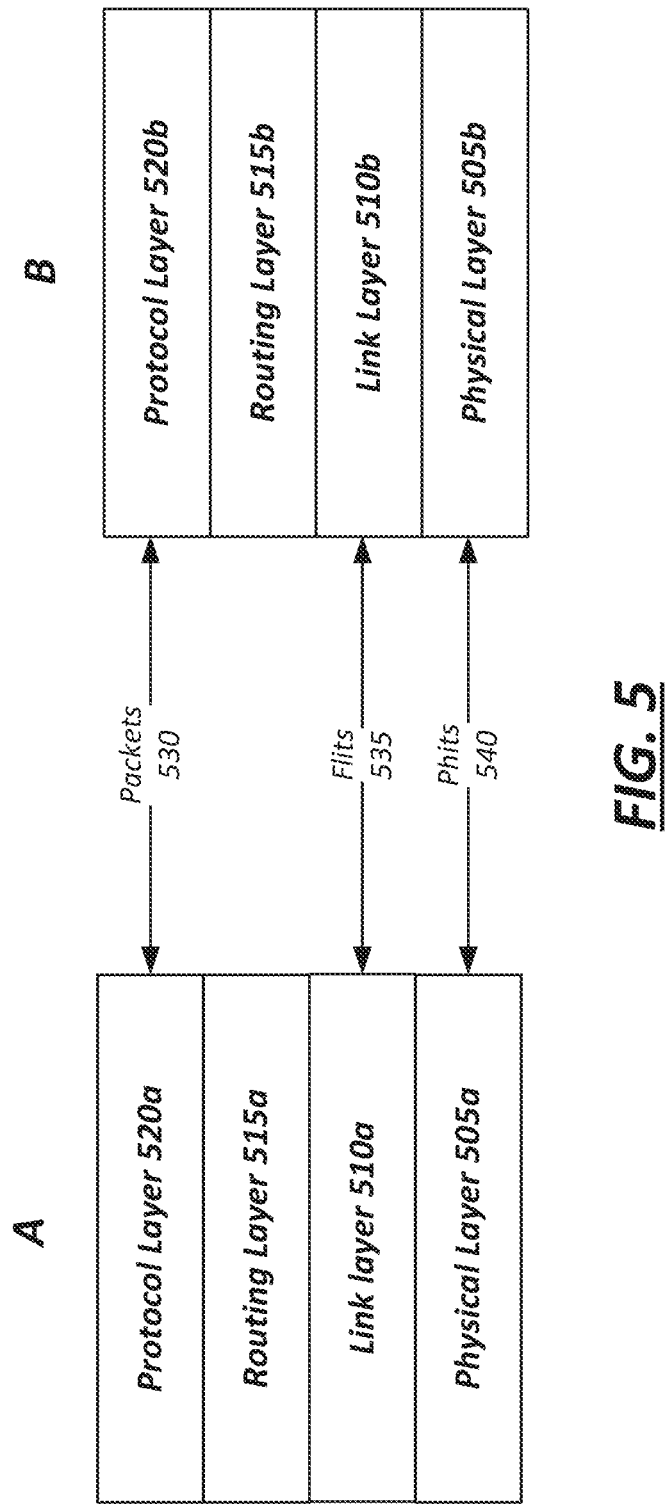
FIG. 5 illustrates an embodiment of a layered protocol stack associated with a high performance general purpose input/output (GPIO) interconnect.

In one implementation, as shown in FIG. 5, Physical layer 505a,b, can be responsible for the fast transfer of information on the physical medium (electrical or optical etc.). The physical link can be point-to-point between two Link layer entities, such as layer 505a and 505b. The Link layer 510a,b can abstract the Physical layer 505a,b from the upper layers and provides the capability to reliably transfer data (as well as requests) and manage flow control between two directly connected entities. The Link Layer can also be responsible for virtualizing the physical channel into multiple virtual channels and message classes. The Protocol layer 520a,b relies on the Link layer 510a,b to map protocol messages into the appropriate message classes and virtual channels before handing them to the Physical layer 505a,b for transfer across the physical links. Link layer 510a,b may support multiple messages, such as a request, snoop, response, writeback, non-coherent data, among other examples.

A Physical layer 505a,b (or PHY) can be implemented above the electrical layer (i.e. electrical conductors connecting two components) and below the link layer 510a,b, as illustrated in FIG. 5. The Physical layer and corresponding logic can reside on each agent and connect the link layers on two agents or nodes (A and B) separated from each other (e.g. on devices on either side of a link). The local and remote electrical layers are connected by physical media (e.g. wires, conductors, optical, etc.). The Physical layer 505a,b, in one embodiment, has two major phases, initialization and operation. During initialization, the connection is opaque to the link layer and signaling may involve a combination of timed states and handshake events. During operation, the connection is transparent to the link layer and signaling is at a speed, with all lanes operating together as a single link. During the operation phase, the Physical layer transports flits 535 from agent A to agent B and from agent B to agent A. The connection is also referred to as a link and abstracts some physical aspects including media, width and speed from the link layers while exchanging flits and control/status of current configuration (e.g. width) with the link layer. The initialization phase includes minor phases e.g. Polling, Configuration. The operation phase also includes minor phases (e.g. link power management states).

In one embodiment, Link layer 510a,b can be implemented so as to provide reliable data transfer between two protocol or routing entities. The Link layer can abstract Physical layer 505a,b from the Protocol layer 520a,b, and can be responsible for the flow control between two protocol agents (A, B), and provide virtual channel services to the Protocol layer (Message Classes) and Routing layer (Virtual Networks). The interface between the Protocol layer 520a,b and the Link Layer 510a,b can typically be at the packet level. In one embodiment, the smallest transfer unit at the Link Layer is referred to as a flit which a specified number of bits, such as 192 bits or some other denomination. The Link Layer 510a,b relies on the Physical layer 505a,b to frame the Physical layer's 505a,b unit of transfer (phit 540) into the Link Layer's 510a,b unit of transfer (flit). In addition, the Link Layer 510a,b may be logically broken into two parts, a sender and a receiver. A sender/receiver pair on one entity may be connected to a receiver/sender pair on another entity. Flow Control is often performed on both a flit and a packet basis. Error detection and correction is also potentially performed on a flit level basis.

In one embodiment, Routing layer 515a,b can provide a flexible and distributed method to route transactions from a source to a destination. The scheme is flexible since routing algorithms for multiple topologies may be specified through programmable routing tables at each router (the programming in one embodiment is performed by firmware, software, or a combination thereof). The routing functionality may be distributed; the routing may be done through a series of routing steps, with each routing step being defined through a lookup of a table at either the source, intermediate, or destination routers. The lookup at a source may be used to inject a packet into the fabric. The lookup at an intermediate router may be used to route an packet from an input port to an output port. The lookup at a destination port may be used to target the destination protocol agent. Note that the Routing layer, in some implementations, can be thin since the routing tables, and, hence the routing algorithms, are not specifically defined by specification. This allows for flexibility and a variety of usage models, including flexible platform architectural topologies to be defined by the system implementation. The Routing layer 515a,b relies on the Link layer 510a,b for providing the use of up to three (or more) virtual networks (VNs)—in one example, two deadlock-free VNs, VN0 and VN1 with several message classes defined in each virtual network. A shared adaptive virtual network (VNA) may be defined in the Link layer, but this adaptive network may not be exposed directly in routing concepts, since each message class and virtual network may have dedicated resources and guaranteed forward progress, among other features and examples.

In one embodiment, Protocol Layer 520a,b can provide a Coherence Protocol to support agents caching lines of data from memory. An agent wishing to cache memory data may use the coherence protocol to read the line of data to load into its cache. An agent wishing to modify a line of data in its cache may use the coherence protocol to acquire ownership of the line before modifying the data. After modifying a line, an agent may follow protocol requirements of keeping it in its cache until it either writes the line back to memory or includes the line in a response to an external request. Lastly, an agent may fulfill external requests to invalidate a line in its cache. The protocol ensures coherency of the data by dictating the rules all caching agents may follow. It also provides the means for agents without caches to coherently read and write memory data.

Physical layers of existing interconnect and communication architectures, including PCIe, can be leveraged to provide shared memory and I/O services within a system. Traditionally, cacheable memory cannot be shared between independent systems using traditional load/store (LD/ST) memory semantics. An independent system, or "node", can be independent in the sense that it functions as a single logical entity, is controlled by a single operating system (and/or single BIOS or Virtual Machine Monitor (VMM)), and/or has an independent fault domain. A single node can include one or multiple processor devices, be implemented on a single board or multiple boards, and include local memory, including cacheable memory that can be accessed using LD/ST semantics by the devices on the same node. Within a node, shared memory can include one or more blocks of memory, such as a random access memory (RAM), that can be accessed by several different processors (e.g., central processing units (CPUs)) within a node. Shared memory can also include the local memory of the processors or other devices in the node. The multiple devices within a node having shared memory can share a single view of data within the shared memory. I/O communication involving shared memory can be very low latency and allow quick access to the memory by the multiple processors.

Traditionally, memory sharing between different nodes has not allowed memory sharing according to a load/store paradigm. For instance, in some systems, memory sharing between different nodes has been facilitated through distributed memory architectures. In traditional solutions, computational tasks operate on local data, and if data of another node is desired, the computational task (e.g., executed by another CPU node) communicates with the other node, for instance, over a communication channel utilizing a communication protocol stack, such as Ethernet, InfiniBand, or another layered protocol. In traditional multi-node systems, the processors of different nodes do not have to be aware where data resides. Sharing data using traditional approaches, such as over a protocol stack, can have a significantly higher latency than memory sharing within a node using a load/store paradigm. Rather than directly addressing and operating on data in shared memory, one node can request data from another using an existing protocol handshake such as Ethernet (or Infiniband), and the source node can provide the data, such that the data can be stored and operated on by the requesting node, among other examples.

In some implementations, a shared memory architecture can be provided that allows memory to be shared between independent nodes for exclusive or shared access using load/store (LD/ST) memory semantics. In one example, memory semantics (and directory information, if applicable) along with I/O semantics (for protocols such as PCIe) can be exported on either a common set of pins or a separate set of pins. In such a system, the improved shared memory architecture can each of a plurality of nodes in a system to maintain its own independent fault domain (and local memory), while enabling a shared memory pool for access by the nodes and low-latency message passing between nodes using memory according to LD/ST semantics. In some implementations, such a shared memory pool can be dynamically (or statically) allocated between different nodes. Accordingly, one can also configure the various nodes of a system into dynamically changing groups of nodes to work cooperatively and flexibly on various tasks making use of the shared memory infrastructure, for instance, as demand arises.

In some implementations, the shared memory architecture can be based on a buffered memory interface. The buffered memory interface, itself, can be based on a general purpose input/output (GPIO) interconnect interface and protocol. For instance, the physical and link layer definitions of the GPIO interconnect can also be implemented in the buffered memory protocol. Indeed, logic used to support the physical and link layers of the GPIO protocol can be reused at interfaces supporting the buffered memory protocol. The buffered memory protocol can also share message classes, such as a request, response, and writeback message class, among other examples. While opcode values within the buffered memory protocol message can be interpreted differently than in the GPIO protocol, the same general packet and flit formats can be utilized in both the buffered memory protocol and the GPIO interconnect upon which it is built.

Figure 6:
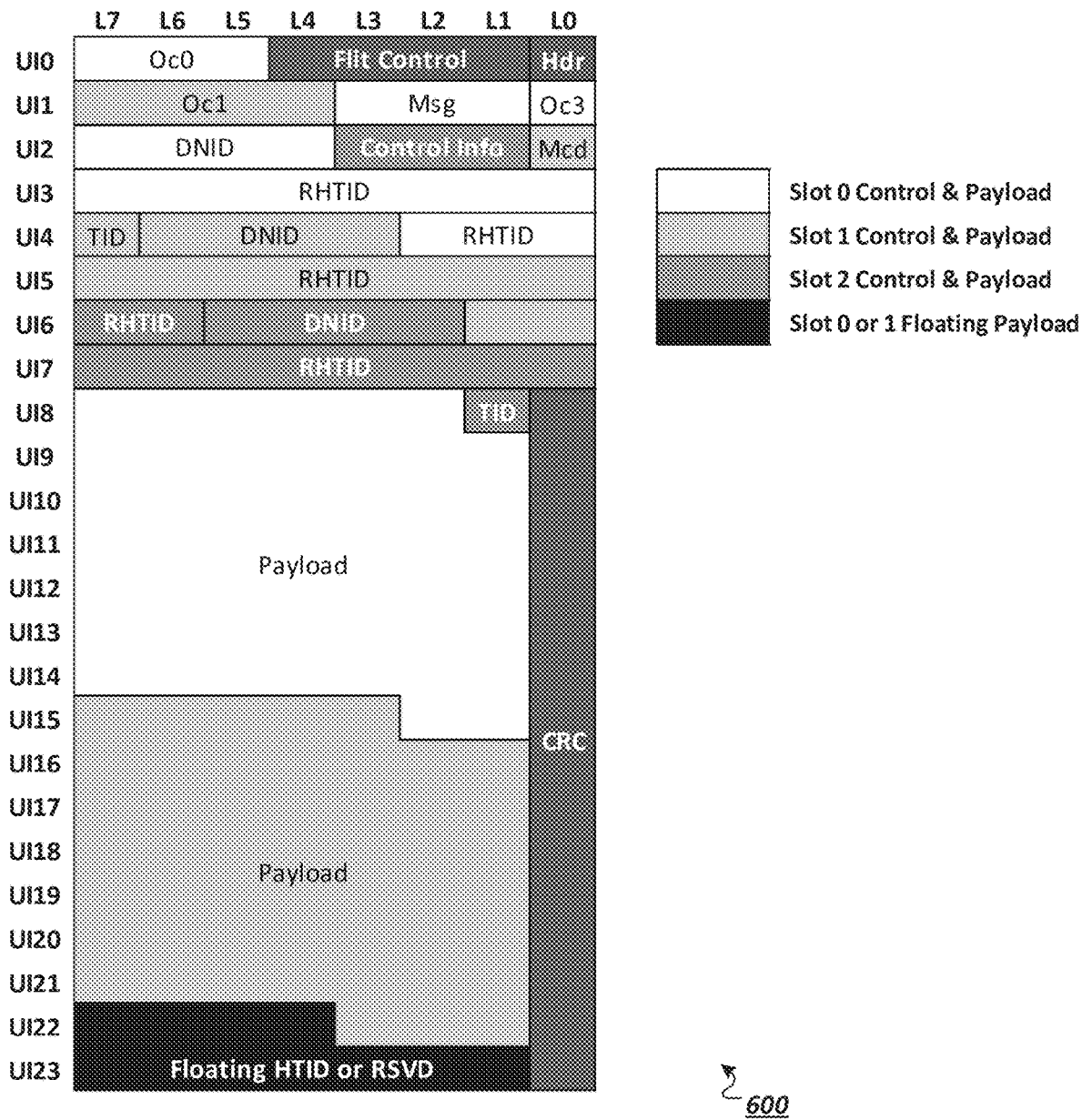
FIG. 6 illustrates a representation of an example multi-slot flit.

In one example, a flit format can be defined for flits to be sent between agents in the GPIO protocol. FIG. 6 illustrates a representation 600 of a generalized flit for an 8 lane link width. Each column of the representation 600 can symbolize a link lane and each row a respective UI. In some implementations, a single flit can be subdivided into two or more slots. Distinct messages or link layer headers can be included in each slot, allowing multiple distinct, and in some cases, independent messages corresponding to potentially different transactions to be sent in a single flit. Further, the multiple messages included in slots of a single flit may also be destined to different destination nodes, among other examples. For instance, the example of FIG. 6 illustrates a flit format with three slots. The shaded portions can represent the portion of the flit included in a respective slot.

In the example of FIG. 6, three slots, Slots 0, 1, and 2, are provided. Slot 0 can be provided 72 bits of flit space, of which 22 bits are dedicated to message header fields and 50 bits to message payload space. Slot 1 can be provided with 70 bits of flit space, of which 20 bits are dedicated to message header fields and 50 bits to message payload space. The difference in message header field space between can be optimized to provide that certain message types will be designated for inclusion in Slot 0 (e.g., where more message header encoding is utilized). A third slot, Slot 2, can be provided that occupies substantially less space than Slots 0 and 1, in this case utilizing 18 bits of flit space. Slot 2 can be optimized to handle those messages, such as acknowledges, credit returns, and the like that do no utilize larger message payloads. Additionally, a floating payload field can be provided that allows an additional 11 bits to be alternatively applied to supplement the payload field of either Slot 0 or Slot 1.

Continuing with the specific example of FIG. 6, other fields can be global to a flit (i.e., apply across the flit and not to a particular slot). For instance, a header bit can be provided together with a 4-bit flit control field that can be used to designate such information as a virtual network of the flit, identify how the flit is to be encoded, among other examples. Additionally, error control functionality can be provided, such as through a 16-bit cyclic CRC field, among other potential examples.

A flit format can be defined so as to optimize throughput of messages on the Link layer. Some traditional protocols have utilized unslotted, smaller flits. For instance, in QPI an 80-bit flit was utilized. While the flit throughput of a larger (e.g., 192-bit flit) may be lower, message or packet throughput can be increased by optimizing use of the flit data. For instance, in some protocols, an entire flit space (e.g., 80-bit) was utilized regardless of the message size or type. By subdividing a larger flit into slots of predetermined lengths and fields, the 192 flit length can be optimized realizing higher efficiency even in instances when one or more of the available slots are sometimes unused. Indeed, Link layer traffic can be assumed to include many different types of messages and traffic, including messages and packets with varying header lengths and fields. The respective lengths and organization of slots defined in a flit can be defined so as to correspond with the statistical or expected frequency of various messages and the needs of these messages. For instance, two larger slots can be defined for every small slot, to accommodate an expected statistical frequency of messaging using these larger message types and header lengths, among other example. Further, flexibility can also be provided to further accommodate the varied traffic, such as through a floating payload field, as in the example of FIG. 6. In some instances, a flit format can be fixed, including the bits dedicated to particular slots in the flit.

In the example of FIG. 6, a "Hdr" field can be provided for the flit generally and represent a header indication for the flit. In some instances, the Hdr field can indicate whether the flit is a header flit or a data flit. In data flits, the flit can still remain slotted, but omit or replace the use of certain fields with payload data. In some cases, data fields may include an opcode and payload data. In the case of header flits, a variety of header fields can be provided. In the example of FIG. 6, "Oc" fields can be provided for each slot, the Oc field representing an opcode. Similarly, one or more slots can have a corresponding "msg" field representing a message type of the corresponding packet to be included in the slot, provided the slot is designed to handle such packet types, etc. "DNID" fields can represent a Destination Node ID, a "TID" field can represent a transaction or tracker ID, a "RHTID" field can represent either a requestor node ID or a home tracker ID, among other potential fields. Further, one or more slots can be provided with payload fields. Additionally, a CRC field can be included within a flit to provide a CRC value for the flit, among other examples.

Figure 7:
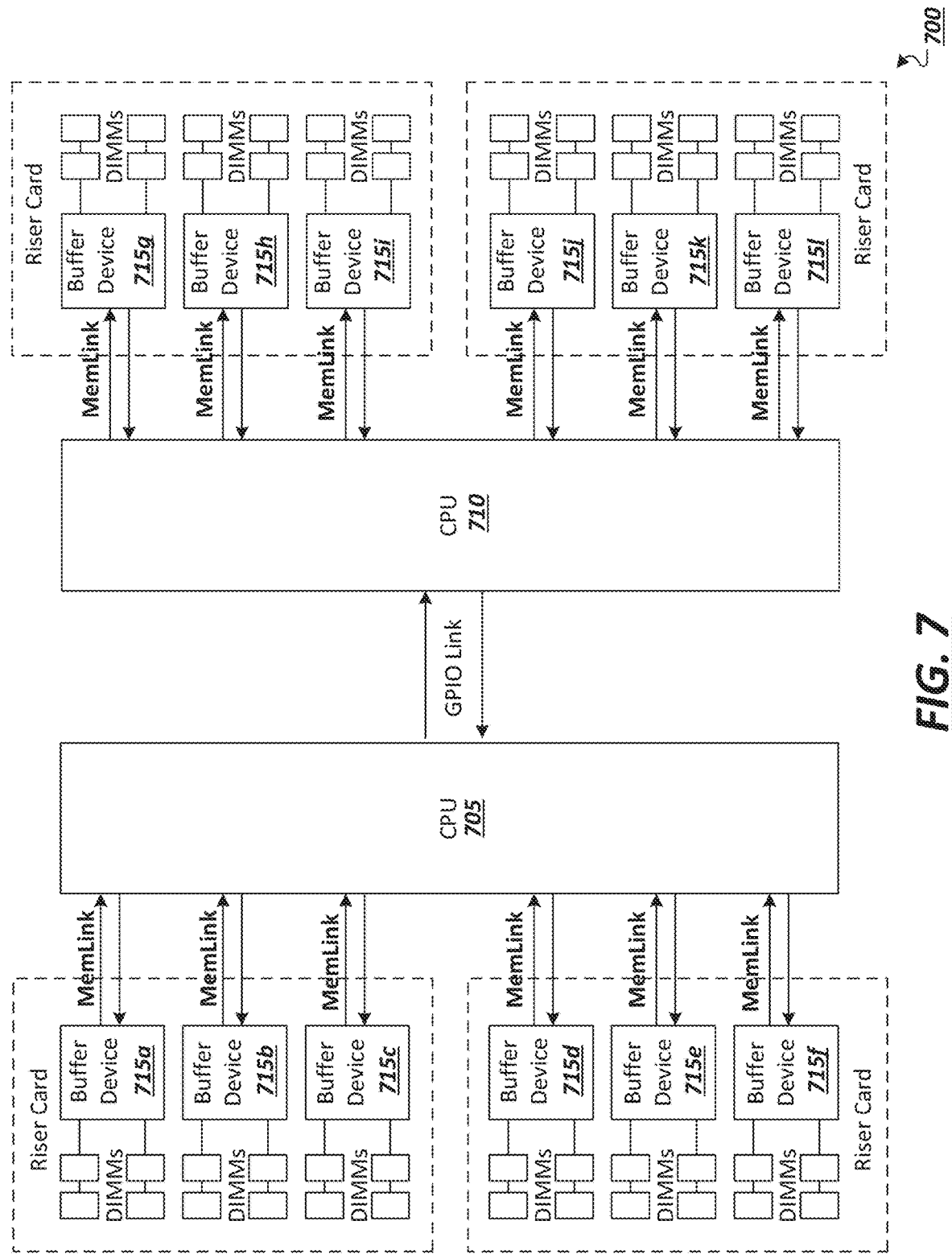
FIG. 7 illustrates an example system utilizing buffered memory access.

The multi-slotted flit of a GPIO protocol can be reused by a buffered memory protocol. FIG. 7 shows a simplified block diagram 700 illustrating an example topology of a computing system including CPU devices 705, 710 interconnected by an GPIO interconnect link. Each CPU 705, 710 can be likewise connected to one or more respective buffer devices 715a-1 using corresponding buffered memory protocol links ("MemLink"). Each buffer device can implement a memory controller for system memory of the system. As noted above, in some implementations, the buffered memory protocol interconnect can be based on the GPIO protocol, in that the physical and link layers of the buffered memory protocols are based on the same physical and link layer definitions of the GPIO protocol. Although not illustrated in FIG. 7, the CPUs 705, 710 can be further connected to one or more downstream devices using the GPIO protocol.

As further shown in the example of FIG. 7, buffer devices 715a4 can be connected to memory devices, such as dual in-line memory module (DIMM) devices. The memory corresponding to each buffer device can be considered local to the CPU (e.g., 705, 701) to which the buffer device is connected. However, other devices (including the other CPU) can access the memory by other sockets using GPIO protocol-compliant links. In some implementations, a port running the buffered memory protocol may only support the commands for communicating with the memory and only support the buffered memory protocol (i.e., not the GPIO protocol and the buffered memory protocol). Additionally, in some implementations, the GPIO interconnect protocol may support routing and indicate such information (e.g., in its packets) such as the requesting and destination node identifiers. The buffered memory protocol, on the other hand, may be a point-to-point interface that does not utilize routing. Consequently, some fields used in the GPIO protocol may be dispensed with in packets sent using the buffered memory interfaces. Instead, fields can be designated for use in carrying address decode information host to buffer, among other examples.

In further implementations, buffer devices 715a-1 can support a two level memory topology with some amount of fast memory (e.g., DRAM) serving as a cache for a larger, slower memory (e.g., non-volatile memory). In one such implementation, one or more of the buffer devices 715a-1 can use DDR as near, fast memory and transactional DDR DIMMs as the larger "far" memory, among other examples. Transactional DIMMs can utilize protocols (e.g., DDR-Transactional (DDR-T)) to communicate to a volatile memory single in-line memory module (SIMM) using transactional commands.

Figure 8A:
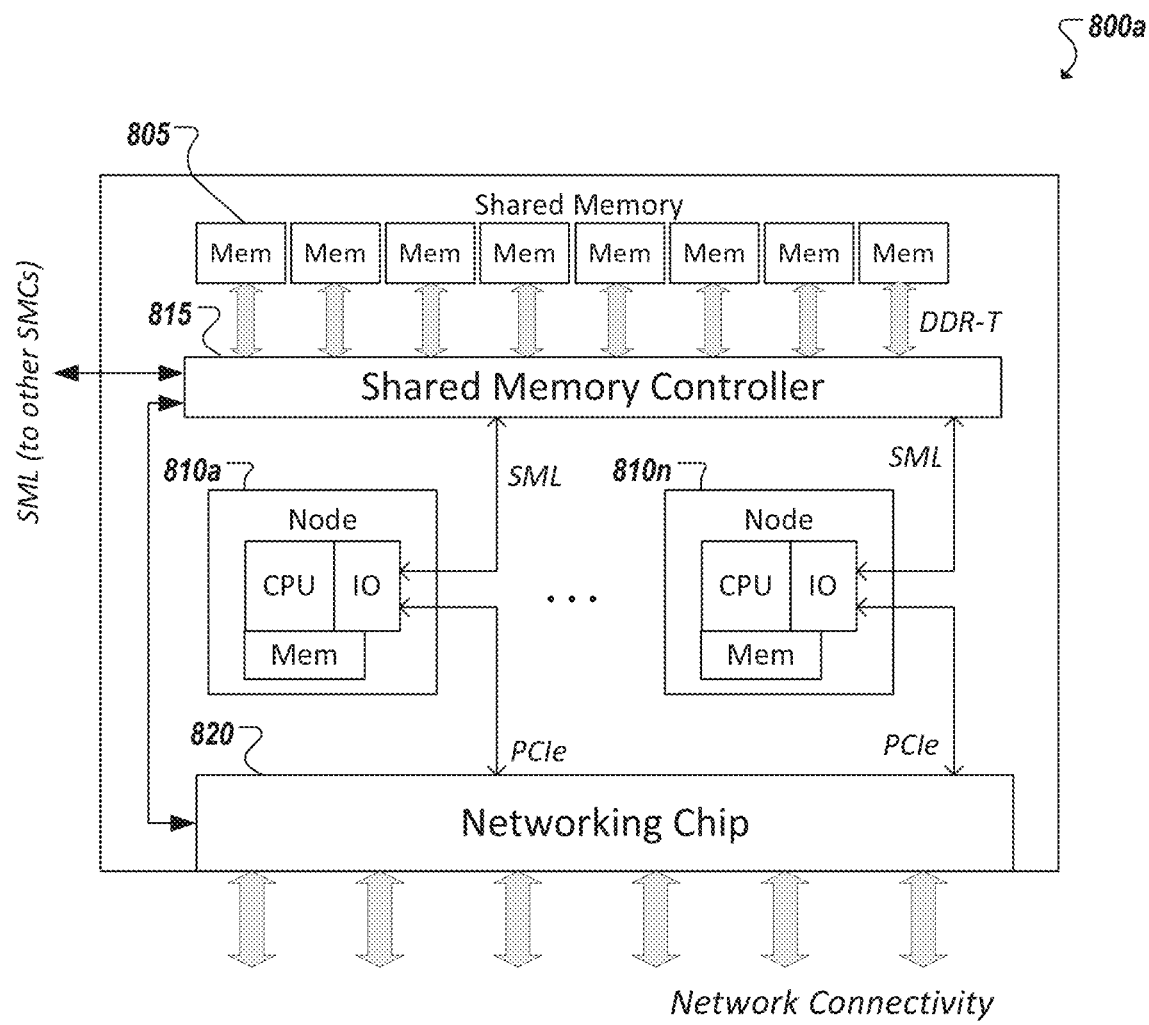
FIG. 8A illustrates a simplified block diagram of an embodiment of an example node.

The buffered memory protocol and systems utilizing a buffered memory protocol (such as those illustrated above) can be extended to enable a shared memory architecture that allows memory to be shared between independent nodes for exclusive or shared access using load/store (LD/ST) memory semantics. Turning to FIG. 8A, a simplified block diagram 800a is shown illustrating an example system including shared memory 805 capable of being accessed using load/store techniques by each of a plurality of independent nodes 810a-810n. For instance, a shared memory controller 815 can be provided that can accept load/store access requests of the various nodes 810a-810n on the system. Shared memory 805 can be implemented utilizing synchronous dynamic random access memory (SDRAM), dual in-line memory modules (DIMM), and other non-volatile memory (or volatile memory).

Each node may itself have one or multiple CPU sockets and may also include local memory that remains insulated from LD/ST access by other nodes in the system. The node can communicate with other devices on the system (e.g., shared memory controller 815, networking controller 820, other nodes, etc.) using one or more protocols, including PCIe, QPI, Ethernet, among other examples. In some implementations, a shared memory link (SML) protocol can be provided through which low latency LD/ST memory semantics can be supported. SML can be used, for instance, in communicating reads and writes of shared memory 805 (through shared memory controller 815) by the various nodes 810a-810n of a system.

In one example, SML can be based on a memory access protocol, such as Scalable Memory Interconnect (SMI) 3rd generation (SMI3). Other memory access protocols can be alternatively used, such as transactional memory access protocols such as fully buffered DIMM (FB-DIMM), DDR Transactional (DDR-T), among other examples. In other instances, SML can be based on native PCIe memory read/write semantics with additional directory extensions. A memory-protocol-based implementation of SML can offer bandwidth efficiency advantages due to being tailored to cache line memory accesses. While high performance inter-device communication protocols exist, such as PCIe, upper layers (e.g., transaction and link layers) of such protocols can introduce latency that degrades application of the full protocol for use in LD/ST memory transactions, including transactions involving a shared memory 805. A memory protocol, such as SMI3, can allow a potential additional advantage of offering lower latency accesses since it can bypass most of another protocol stack, such as PCIe. Accordingly, implementations of SML can utilize SMI3 or another memory protocol running on a logical and physical PHY of another protocol, such as SMI3 on PCIe.

As noted, in some implementation, a shared memory controller (SMC) 815 can be provided that includes logic for handling load/store requests of nodes 810a-810n in the system. Load/store requests can be received by the SMC 815 over links utilizing SML and connecting the nodes 810a-810n to the SMC 815. In some implementations the SMC 815 can be implemented as a device, such as an application-specific integrated circuit (ASIC), including logic for servicing the access requests of the nodes 810a-810n for shared memory resources. In other instances, the SMC 815 (as well as shared memory 805) can reside on a device, chip, or board separate from one or more (or even all) of the nodes 810a-810n. The SMC 815 can further include logic to coordinate various nodes' transactions that involve shared memory 805. Additionally, the SMC can maintain a directory tracking access to various data resources, such as each cache line, included in shared memory 805. For instance, a data resource can be in a shared access state (e.g., capable of being accessed (e.g., loaded or read) by multiple processing and/or I/O devices within a node, simultaneously), an exclusive access state (e.g., reserved exclusively, if not temporarily, by a single processing and/or I/O device within a node (e.g., for a store or write operation), an uncached state, among other potential examples. Further, while each node may have direct access to one or more portions of shared memory 805, different addressing schemes and values may be employed by the various nodes (e.g., 810a-810n) resulting in the same shared memory data being referred to (e.g., in an instruction) by a first node according to a first address value and a second node being referring to the same data by a second address value. The SMC 815 can include logic, including data structures mapping nodes' addresses to shared memory resources, to allow the SMC 815 to interpret the various access requests of the various nodes.

Additionally, in some cases, some portion of shared memory (e.g., certain partitions, memory blocks, records, files, etc.) may be subject to certain permissions, rules, and assignments such that only a portion of the nodes 810a-810n are allowed (e.g., by the SMC 815) to access the corresponding data. Indeed, each shared memory resource may be assigned to a respective (and in some cases different) subset of the nodes 810a-810n of the system. These assignments can be dynamic and SMC 815 can modify such rules and permissions (e.g., on-demand, dynamically, etc.) to accommodate new or changed rules, permissions, node assignments and ownership applicable to a given portion of the shared memory 805.

An example SMC 815 can further track various transactions involving nodes (e.g., 810a-810n) in the system accessing one or more shared memory resources. For instance, SMC 815 can track information for each shared memory 805 transaction, including identification of the node(s) involved in the transaction, progress of the transaction (e.g., whether it has been completed), among other transaction information. This can permit some of the transaction-oriented aspects of traditional distributed memory architectures to be applied to the improved multi-node shared memory architecture described herein. Additionally, transaction tracking (e.g., by the SMC) can be used to assist in maintaining or enforcing the distinct and independent fault domains of each respective node. For instance, the SMC can maintain the corresponding Node ID for each transaction-in-progress in its internal data structures, including in memory, and use that information to enforce access rights and maintain individual fault-domains for each node. Accordingly, when one of the nodes goes down (e.g., due to a critical error, triggered recovery sequence, or other fault or event), only that node and its transactions involving the shared memory 805 are interrupted (e.g., dumped by the SMC)—transactions of the remaining nodes that involve the shared memory 805 continue on independent of the fault in the other node.

A system can include multiple nodes. Additionally, some example systems can include multiple SMCs. In some cases, a node may be able to access shared memory off a remote SMC to which it is not directly attached to (i.e., the node's local SMC connects to the remote SMC through one or multiple SML Link hops). The remote SMC may be in the same board or could be in a different board. In some cases, some of the nodes may be off-system (e.g., off board or off chip) but nonetheless access shared memory 805. For instance, one or more off-system nodes can connect directly to the SMC using an SML-compliant link, among other examples. Additionally, other systems that include their own SMC and shared memory can also connect with the SMC 810 to extend sharing of memory 805 to nodes included, for instance, on another board that interface with the other SMC connected to the SMC over an SML link. Still further, network connections can be tunneled through to further extend access to other off-board or off-chip nodes. For instance, SML can tunnel over an Ethernet connection (e.g., provided through network controller 820) communicatively coupling the example system of FIG. 8A with another system that can also include one or more other nodes and allow these nodes to also gain access to SMC 815 and thereby shared memory 805, among other examples.

Figure 8B:
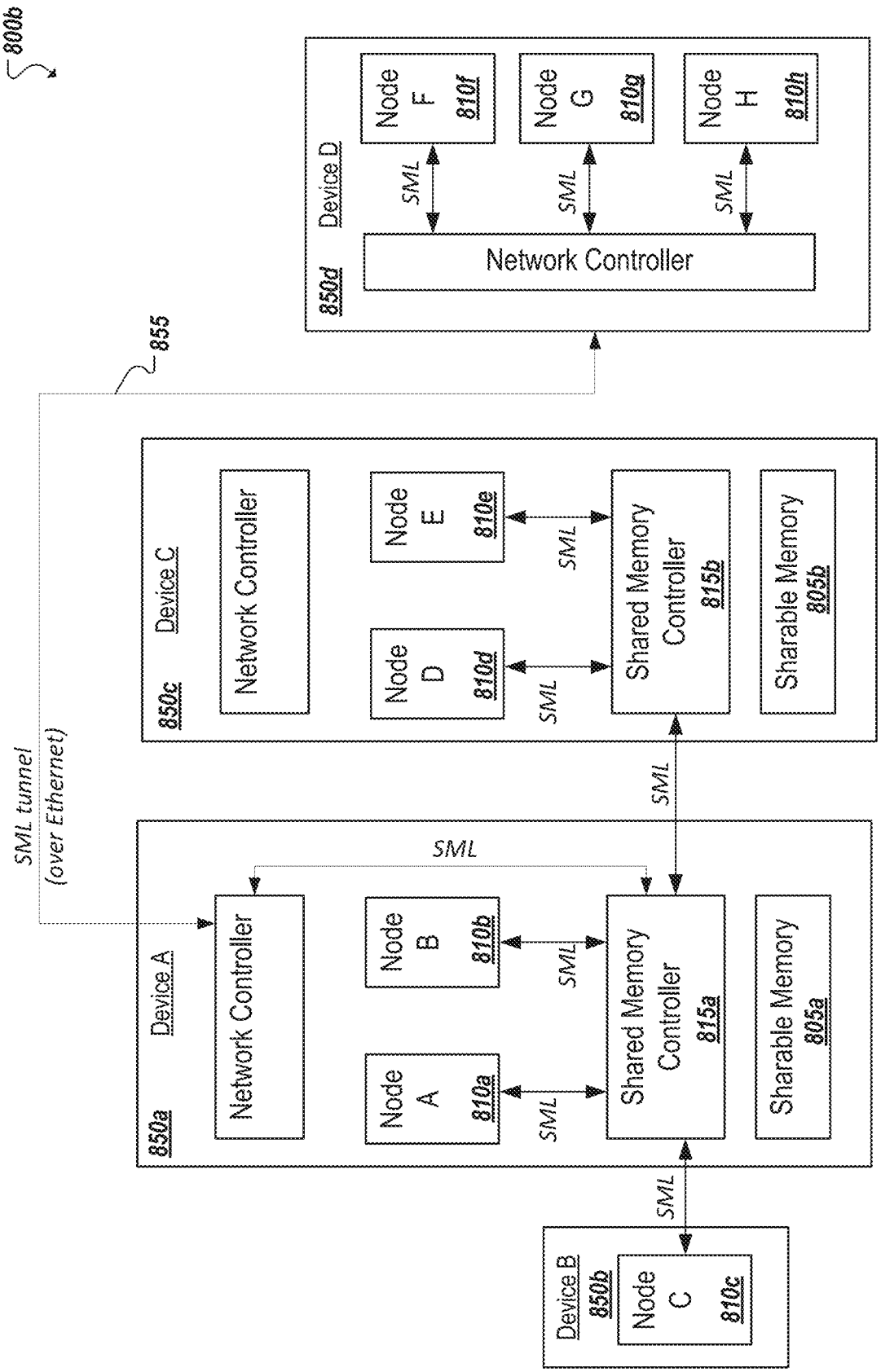
FIG. 8B illustrates a simplified block diagram of an embodiment of an example system including a plurality of nodes.

As another example, as shown in the simplified block diagram 800b of FIG. 8B, an improved shared memory architecture permitting shared access by multiple independent nodes according to a LD/ST memory semantic can flexibly allow for the provision of a variety of different multi-node system designs. Various combinations of the multiple nodes can be assigned to share portions of one or more shared memory blocks provided in an example system. For instance, another example system shown in the example of FIG. 8B, can include multiple devices 850a-850d implemented, for instance, as separate dies, boards, chips, etc., each device including one or more independent CPU nodes (e.g., 810a-810h). Each node can include its own local memory. One or more of the multiple devices 850a-850d can further include shared memory that can be accessed by two or more of the nodes 810a-810h of the system.

The system illustrated in FIG. 8B is an example provided to illustrate some of the variability that can be realized through an improved shared memory architecture, such as shown and described herein. For instance, each of a Device A 850a and Device C 850c can include a respective shared memory element (e.g., 805a, 805b). Accordingly, in some implementations, each shared memory element on a distinct device may further include a respective shared memory controller (SMC) 815a, 815b. Various combinations of nodes 810a-810h can be communicatively coupled to each SMC (e.g., 815a, 815b) allowing the nodes to access the corresponding shared memory (e.g., 805a, 805b). As an example, SMC 815a of Device A 850a can connect to nodes 810a, 810b on Device A using a direct data link supporting SML. Additionally, another node 810c on another device (e.g., Device C 850c) can also have access to the shared memory 805a by virtue of a direct, hardwired connection (supporting SML) from the node 810c (and/or its device 850c) to SMC 815a. Indirect, network-based, or other such connections can also be used to allow nodes (e.g., 810f-810h) of a remote or off-board device (e.g., Device D 850d) to utilize a conventional protocol stack to interface with SMC 815a to also have access to shared memory 805a. For instance, an SML tunnel 855 can be established over an Ethernet, InfiniBand, or other connection coupling Device A and Device D. While establishing and maintaining the tunnel can introduce some additional overhead and latency, compared to SML running on other less-software-managed physical connections, the SML tunnel 855 when established can operate as other SML channels and allow the nodes 810f-810h to interface with SMC 815a over SML and access shared memory 805a as any other node communicating with SMC over an SML link can. For instance, reliability and ordering of the packets in the SML channels can be enforced either by the networking components in the system or it can be enforced end-to-end between the SMCs.

In still other examples, nodes (e.g., 815d, 815e) on a device different from that hosting a particular portion of shared memory (e.g., 805a) can connect indirectly to the corresponding SMC (e.g., SMC 815a) by connecting directly to another SMC (e.g., 815b) that is itself coupled (e.g., using an SML link) to the corresponding SMC (e.g., 815a). Linking two or more SMCs (e.g., 815a, 815b) can effectively expand the amount of shared memory available to the nodes 810a-810h on the system. For instance, by virtue of a link between SMCs 815a, 815b in the example of FIG. 8B, in some implementations, any of the nodes (e.g., 810a-810c, 810f-810h) capable of accessing shared memory 805a through SMC 815a may also potentially access sharable memory 805b by virtue of the connection between SMC 815a and SMC 815b. Likewise, in some implementations, each of the nodes directly accessing SMC 815b can also access sharable memory 805a by virtue of the connection between the SMCs 815a, 815b, among other potential examples.

As noted, independent nodes can each access shared memory, including shared memory included in memory not connected to the SMC to which the node is directly connected. The shared memory is effectively pooled. While a traditional buffered memory protocol can assume point-to-point communication, the pooling of shared memory and joint management of this memory by multiple SMCs can involve packets and flits relating to this memory to traverse multiple hops and SMCs before they arrive to their intended destination. In this respect, the multiple SMCs can form a network of SMCs and each SMC can include logic for determining how to route a particular flit from its directly connected nodes to the SMC connected to the memory addressed by the flit. For instance, in FIG. 8C, an example 800c is shown of multiple SMCs 815a-c interconnected with each other SMC by one or more SML links. Each SMC can be connected to a subset of the processor nodes in the system. Further, each SMC can directly connect to and provide access to a respective subset of the memory elements that compose the shared memory pool. As an example, SMC 815a can connect to nodes 810a, 810b and shared memory elements (e.g., 805a). Another node 810i can access a line of memory stored in shared memory portion 805a by sending a request to SMC 815c which can route the request, over an SML link to SMC 815a. SMC 815a can manage a memory action in connection with the request and respond, in some cases, by providing read data, an acknowledgement, or other information to the node 810i by routing the response over an SML link to SMC 815c. Instead of routing SML communications directly between SMC 815a and 815c, in other instances, the communications can additionally be routed over other SMCs (e.g., 815b). Accordingly, each SMC in a shared memory architecture can include routing logic, implemented in hardware and/or software to facilitate routing communications between SMCs within the network.

As noted above, an improved shared memory architecture can include a low-latency link protocol (i.e., SML) based on a memory access protocol, such as SMI3, and provided to facilitate load/store requests involving the shared memory. Whereas traditional SMI3 and other memory access protocols may be configured for use in memory sharing within a single node, SML can extend memory access semantics to multiple nodes to allow memory sharing between the multiple nodes. Further, SML can potentially be utilized on any physical communication link. SML can utilize a memory access protocol supporting LD/ST memory semantics that is overlaid on a physical layer (and corresponding physical layer logic) adapted to interconnect distinct devices (and nodes). Additionally, physical layer logic of SML can provide for no packet dropping and error retry functionality, among other features.

In some implementations, SML can be can be implemented by overlaying SMI3 on a PCIe PHY. An SML link layer can be provided (e.g., in lieu of a traditional PCIe link layer) to forego flow control and other features and facilitate lower latency memory access such as would be characteristic in traditional CPU memory access architectures. In one example, SML link layer logic can multiplex between shared memory transactions and other transactions. For instance, SML link layer logic can multiplex between SMI3 and PCIe transactions. For instance, SMI3 (or another memory protocol) can overlay on top of PCIe (or another interconnect protocol) so that the link can dynamically switch between SMI3 and PCIe transactions. This can allow traditional PCIe traffic to effectively coexist on the same link as SML traffic in some instances.

Figure 9:
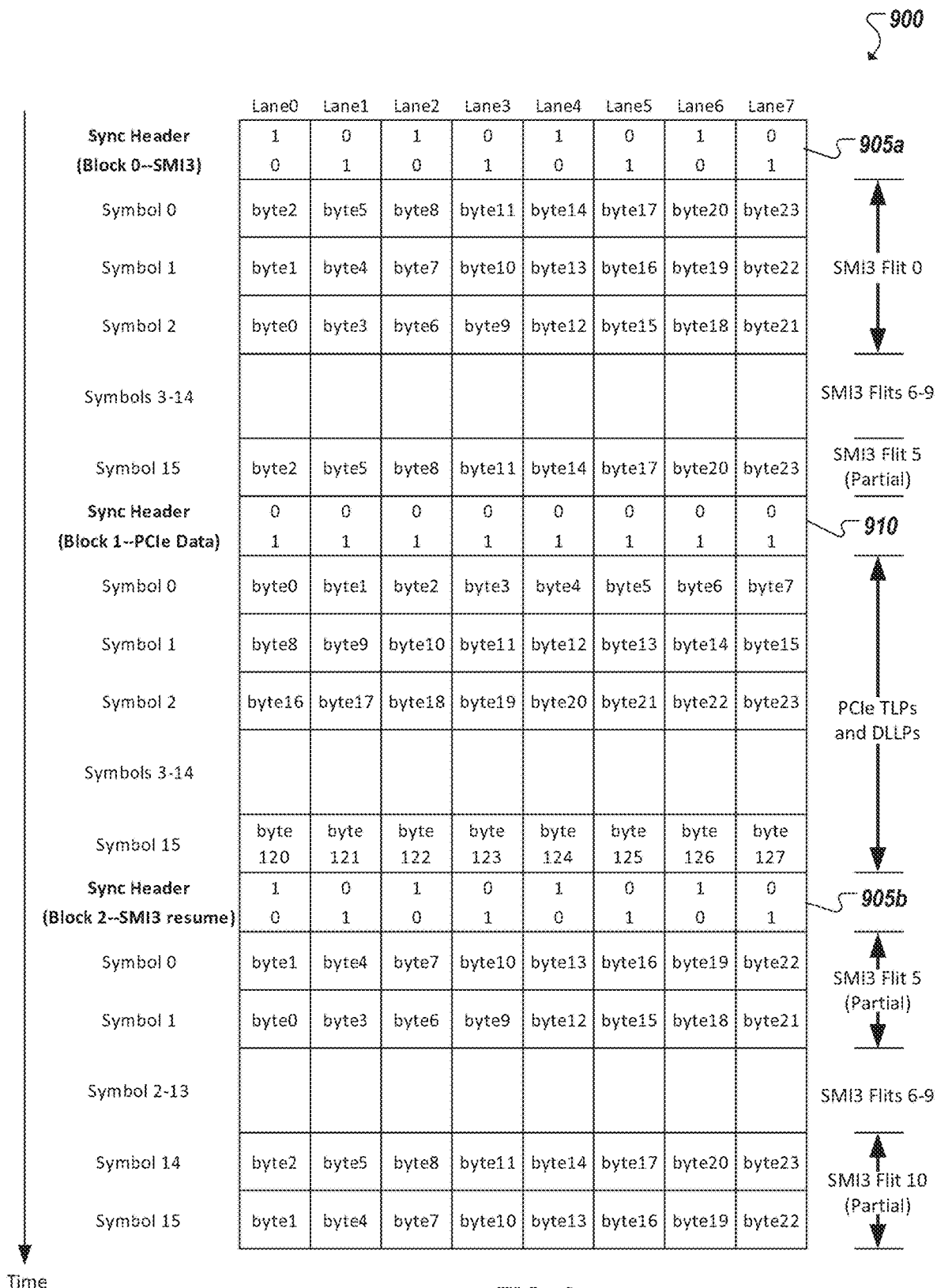
FIG. 9 is a representation of data transmitted according to an example shared memory link.

Turning to FIG. 9, a representation 900 is shown illustrating a first implementation of SML. For instance, SML can be implemented by overlaying SMI3 on a PCIe PHY. The physical layer can use standard PCIe 128b/130b encoding for all physical layer activities including link training as well as PCIe data blocks. SML can provide for traffic on the lanes (e.g., Lane0-Lane7) of the link to be multiplexed between PCIe packets and SMI3 flits. For example, in the implementation illustrated in FIG. 9, the sync header of the PCIe 128b/130b encoding can be modified and used to indicate that SMI3 flits are to be sent on the lanes of the link rather than PCIe packets. In traditional PCIe 128b/130b encoding, valid sync headers (e.g., 910) can include the sending of either a 10b pattern on all lanes of the link (to indicate that the type of payload of the block is to be PCIe Data Block) or a 01b pattern on all lanes of the link (to indicate that the type of payload of the block is to be PCIe Ordered Set Block). In an example of SML, an alternate sync header can be defined to differentiate SMI3 flit traffic from PCIe data blocks and ordered sets. In one example, illustrated in FIG. 9, the PCIe 128b/130b sync header (e.g., 905a, 905b) can be encoded with alternating 01b, 10b patterns on odd/even lanes to identify that SMI3 flits are to be sent. In another alternative implementation, the 128b/130b sync header encoding for SMI3 traffic can be defined by alternating 10b, 01b patterns on odd/even lanes, among other example encodings. In some cases, SMI3 flits can be transmitted immediately following the SMI3 sync header on a per-byte basis, with the transition between PCIe and SMI3 protocols taking place at the block boundary.

In some implementations, such as that illustrated in the example of FIG. 9, the transition between the protocols can be defined to take place at the block boundary irrespective of whether it corresponds to an SMI3 flit or PCIe packet boundary. For instance, a block can be defined to include a predefined amount of data (e.g., 16 symbols, 128 bytes, etc.). In such implementations, when the block boundary does not correspond to an SMI3 flit or PCIe packet boundary, the transmission of an entire SMI3 flit may be interrupted. An interrupted SMI3 flit can be resumed in the next SMI3 block indicated by the sending of another sync header encoded for SMI3.

Figure 10A:
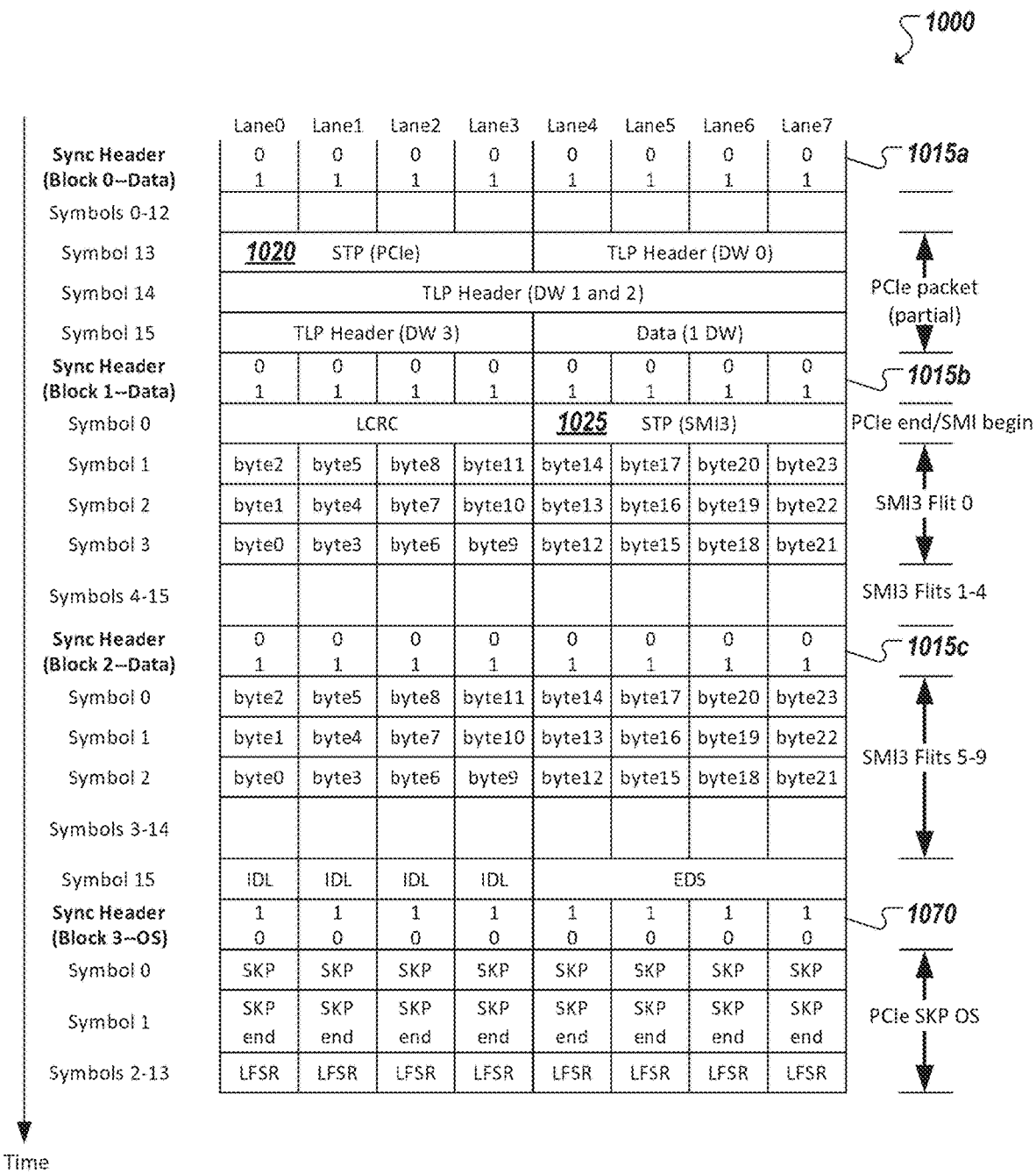
FIG. 10A is a representation of data transmitted according to another example of a shared memory link.

Turning to FIG. 10A, a representation 1000 is shown illustrating another example implementation of SML. In the example of FIG. 10A, rather than using a specialized sync header encoding to signal transitions between memory access and interconnect protocol traffic, physical layer framing tokens can be used. A framing token (or "token") can be a physical layer data encapsulation that specifies or implies the number of symbols to be included in a stream of data associated with the token. Consequently, the framing token can identify that a stream is beginning as well as imply where it will end and can therefore be used to also identify the location of the next framing token. A framing token of a data stream can be located in the first symbol (Symbol 0) of the first lane (e.g., Lane 0) of the first data block of the data stream. In the example of PCIs, five framing tokens can be defined, including start of TLP traffic (STP) token, end of data stream (EDS) token, end bad (EDB) token, start of DLLP (SDP) token, and logical idle (IDL) token.

Figure 10B:
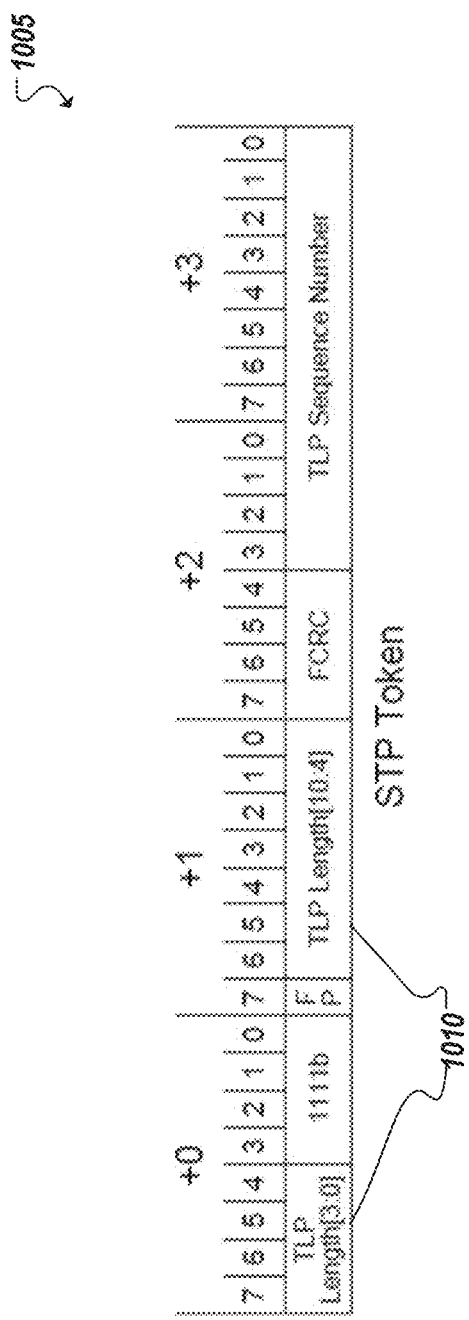
FIG. 10B is a representation of an example start of data framing token.

In the example of FIG. 10A, SML can be implemented by overlaying (or "tunneling") SMI3 or another data access protocol on PCIe and the standard PCIe STP token can be modified to define a new STP token that identifies that SMI3 (instead of TLP traffic) is to commence on the lanes of the link. In some examples, values of reserve bits of the standard PCIe STP token can be modified to define the SMI3 STP token in SML. Further, as shown in FIG. 10B, an STP token 1005 can include several fields, including a 1010 field that identifies the length of the SMI3 payload (in terms of the number of flits) that is to follow. In some implementations, one or more standard payload lengths can be defined for TLP data. SMI3 data can, in some implementations, be defined to include a fixed number of flits, or in other cases, may have variable numbers of flits in which case the length field for the number of SMI3 flits becomes a field that can be disregarded. Further, the length field for an SMI3 STP can be defined as a length other than one of the defined TLP payload lengths. Accordingly, an SMI3 STP can be identified based on a non-TLP length value being present in the STP length field, as one example. For example, in one implementation, the upper 3-bits of the 11-bit STP length field can be set to 111b to indicate the SMI3 packet (e.g., based on the assumption that no specification-compliant PCIe TLP can be long enough to have a length where the upper 3 bits of the length field would result in 1's). Other implementations can alter or encode other fields of the STP token to differentiate a PCIe STP token identifying a traditional PCIe TLP data payload from a SMI3 STP token identifying that SMI3 data is encapsulated in TLP data.

Returning to the example of FIG. 10A, sync header data can follow the encoding specified for traditional PCIe 128b/130b encoding. For instance, at 1015a-c, sync headers with value 10b are received indicating that data blocks are forthcoming. When a PCIe STP (e.g., 1020) is received, a PCIe TLP payload is expected and the data stream is processed accordingly. Consistent with the payload length identified in the PCIe STP 1020, the PCIe TLP payload can utilize the full payload length allocated. Another STP token can be received essentially at any time within a data block following the end of the TLP payload. For instance, at 1025, an SMI3 STP can be received signaling a transition from PCIe TLP data to SMI3 flit data. The SMI3 STP can be sent, for instance, as soon as an end of the PCIe packet data is identified.

Continuing with the example of FIG. 10A, as with PCIe TLP data, the SMI3 STP 1025 can define a length of the SMI3 flit payload that is to follow. For instance, the payload length of the SMI3 data can correspond to the number of SMI3 flits in terms of DWs to follow. A window (e.g., ending at Symbol 15 of Lane 3) corresponding to the payload length can thereby be defined on the lanes, in which only SMI3 data is to be sent during the window. When the window concludes, other data can be sent, such as another PCIe STP to recommence sending of TLP data or other data, such as ordered set data. For instance, as shown in the example of FIG. 10A, an EDS token is sent following the end of the SMI3 data window defined by SMI3 STP token 1025. The EDS token can signal the end of the data stream and imply that an ordered set block is to follow, as is the case in the example of FIG. 10A. A sync header 1040 is sent that is encoded 01b to indicate that an ordered set block is to be sent. In this case a PCIe SKP ordered set is sent. Such ordered sets can be sent periodically or according to set intervals or windows such that various PHY-level tasks and coordination can be performed, including initializing bit alignment, initializing symbol alignment, exchanging PHY parameters, compensating for different bit rates for two communicating ports, among other examples. In some cases, a mandated ordered set can be sent to interrupt a defined window or data block specified for SMI3 flit data by a corresponding SMI3 STP token.

While not shown explicitly in the example of FIG. 10A, an STP token can also be used to transition from SMI3 flit data on the link to PCIe TLP data. For instance, following the end of a defined SMI3 window, a PCIe STP token (e.g., similar to token 1020) can be sent to indicate that the next window is for the sending of a specified amount of PCIe TLP data.

Memory access flits (e.g., SMI3 flits) may vary in size in some embodiments, making it difficult to predict, a priori, how much data to reserve in the corresponding STP token (e.g., SMI3 STP token) for the memory access payload. As an example, as shown in FIG. 10, SMI3 STP 1025 can have a length field indicating that 244 bytes of SMI3 data is to be expected following the SMI3 STP 1025. However, in this example, only ten flits (e.g., SMI3 Flits 0-9) are ready to be sent during the window and these ten SMI3 flits only utilize 240 of the 244 bytes. Accordingly, four (4) bytes of empty bandwidth is left, and these are filled with IDL tokens. This can be particularly suboptimal when PCIe TLP data is queued and waiting for the SMI3 window to close. In other cases, the window provided for the sending of SMI3 flits may be insufficient to send the amount of SMI3 data ready for the lane. Arbitration techniques can be employed to determine how to arbitrate between SMI3 and PCIe TLP data coexisting on the link. Further, in some implementations, the length of the SMI3 windows can be dynamically modified to assist in more efficient use of the link. For instance, arbitration or other logic can monitor how well the defined SMI3 windows are utilized to determine whether the defined window length can be better optimized to the amount of SMI3 (and competing PCIe TLP traffic) expected for the lane. Accordingly, in such implementations, the length field values of SMI3 STP tokens can be dynamically adjusted (e.g., between different values) depending on the amount of link bandwidth that SMI3 flit data should be allocated (e.g., relative to other PCIe data, including TLP, DLLP, and ordered set data), among other examples.

Figure 11:
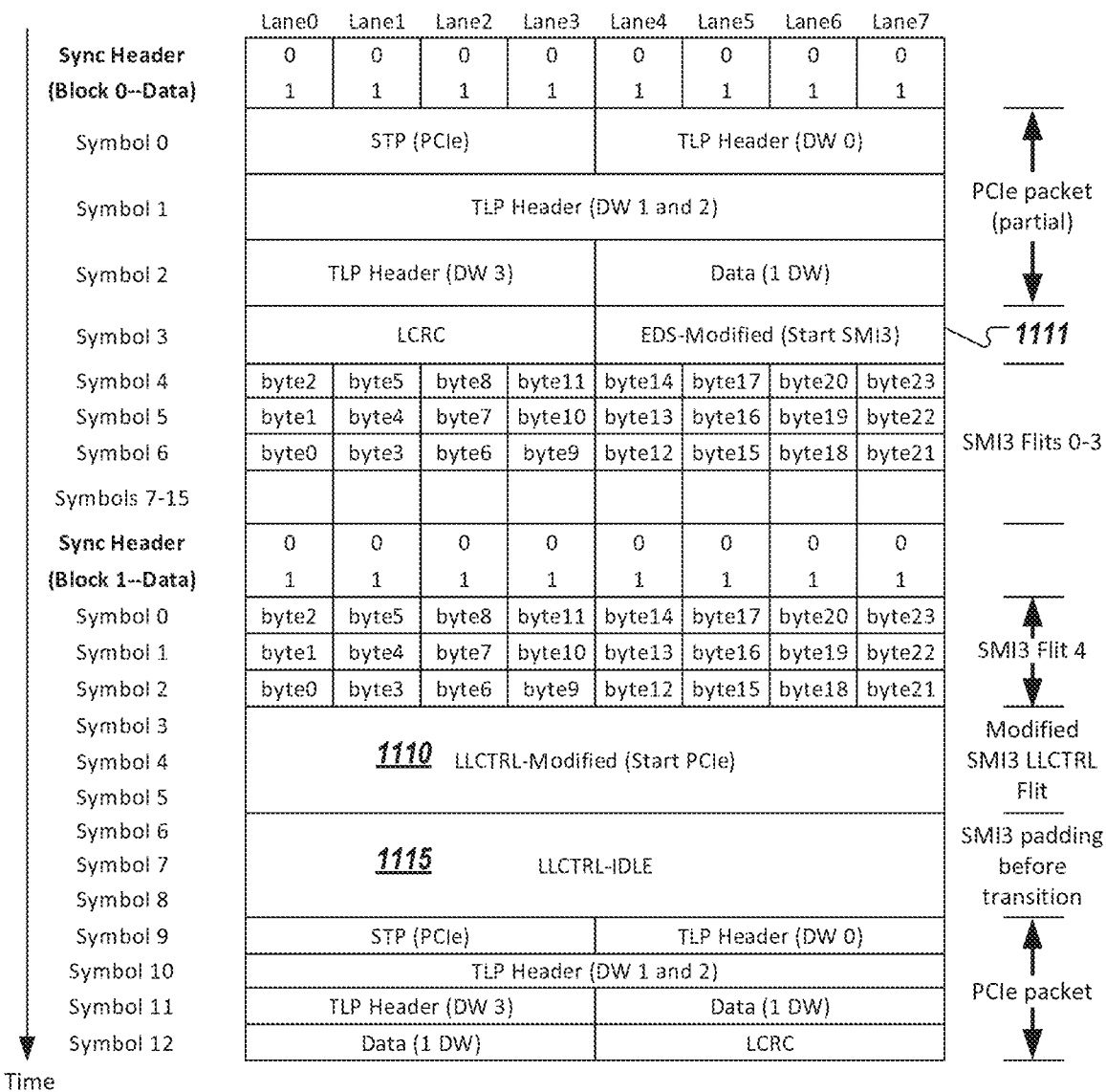
FIG. 11 is a representation of data transmitted according to another example of a shared memory link.

Turning to FIG. 11, a representation 1100 of another example implementation of SML is illustrated. In this alternative embodiment, SML can provide for interleaving SMI3 and PCIe protocols through a modified PCIe framing token. As noted above, an EDS token can be used in PCIe to indicate an end of a data stream and indicate that the next block will be an ordered set block. In the example of FIG. 11, SML can define an SMI3 EDS token (e.g., 1105) that indicates the end of a TLP data stream and the transition to SMI3 flit transmissions. An SMI3 EDS (e.g., 1105) can be defined by encoding a portion of the reserved bits of the traditional EDS token to indicate that SMI3 data is to follow, rather than PCIe ordered sets or other data that is to follow a PCIe EDS. Unlike the traditional EDS token, the SMI3 EDS can be sent at essentially anywhere within a PCIe data block. This can permit additional flexibility in sending SMI3 data and accommodating corresponding low-latency shared memory transactions. For instance, a transition from PCIe to SMI3 can be accomplished with a single double word (DW) of overhead. Further, as with traditional EDS tokens, an example SMI3 EDS may not specify a length associated with the SMI3 data that is to follow the token. Following an SMI3 EDS, PCIe TLP data can conclude and SMI3 flits proceed on the link. SMI3 traffic can proceed until SMI3 logic passes control back to PCIe logic. In some implementations, the sending of an SMI3 EDS causes control to be passed from PCIe logic to SMI3 logic provided, for instance, on devices connected on the link.

In one example, SMI3 (or another protocol) can define its own link control signaling for use in performing link layer control. For example, in one implementation, SML can define a specialized version of a SMI3 link layer control (LLCTRL) flit (e.g., 1110) that indicates a transition from SMI3 back to PCIe protocol. As with an SMI3 EDS, the defined LLCTRL flit (e.g., 1110) can cause control to be passed from SMI3 logic back to PCIe logic. In some cases, as shown in the example of FIG. 11, the defined LLCTRL flit (e.g., 1110) can be padded with a predefined number of LLCTRL idle (LLCTRL-IDLE) flits (e.g., 1115) before completing the transition to PCIe. For instance, the number of LLCTRL-IDLE flits 1115 to be sent to pad the SMI3 LLCTRL flit 1110 can depend on the latency to decode the defined SMI3 LLCTRL flit 1110 signaling the transition. After completing the transition back to PCIe, an STP packet can be sent and TLP packet data can recommence on the link under control of PCIe.

Figure 8C:
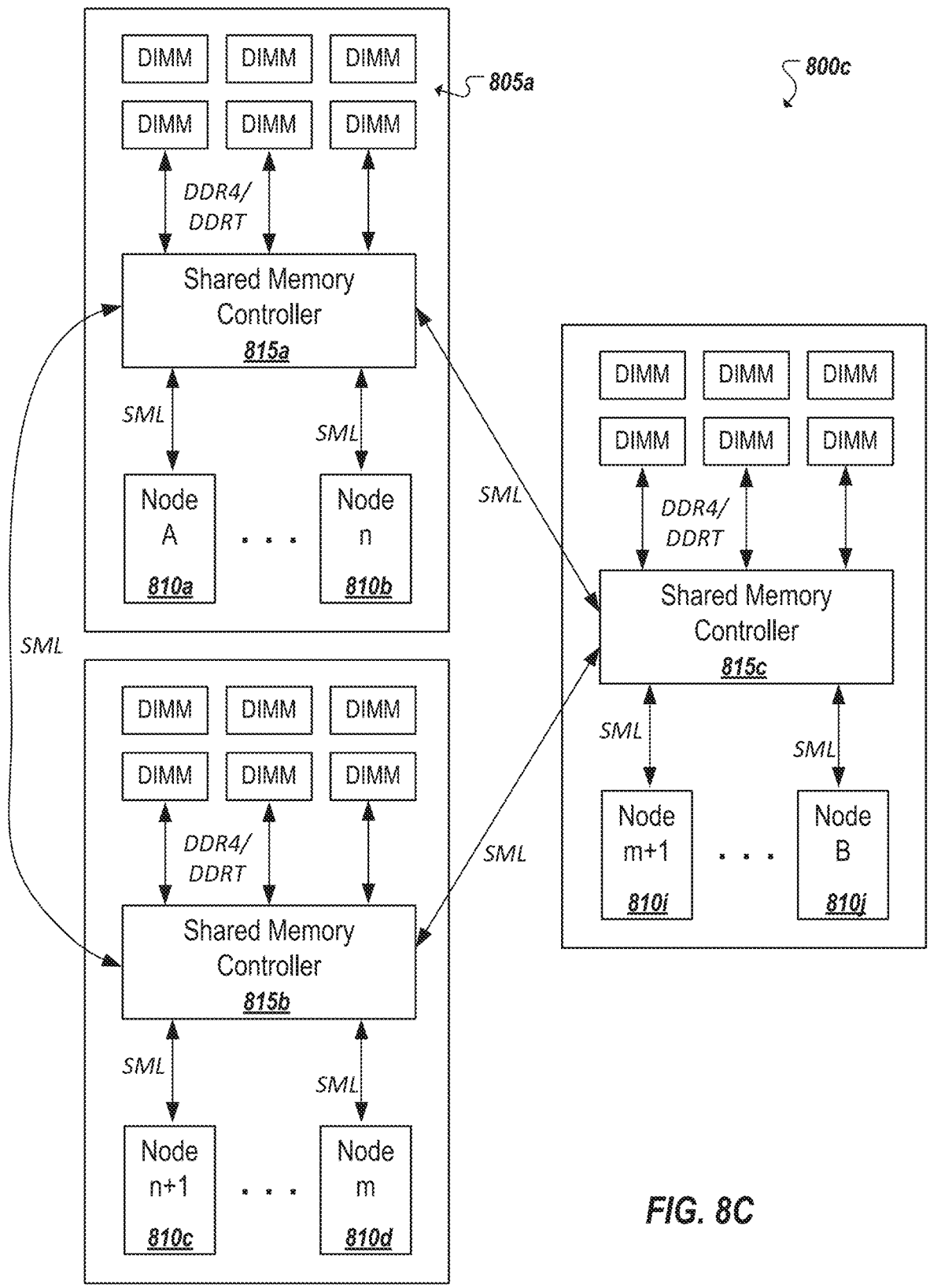
FIG. 8C illustrates another simplified block diagram of an embodiment of an example system including a plurality of nodes.

As noted in connection with the examples of FIGS. 8A-8C, shared memory controllers in a shared buffered memory architecture can include routing logic, implemented in hardware and/or software, to route communications over SML links between SMCs to facilitate data transactions involving nodes and shared memory.

In a multi-node system, it is desirable to have a set of resources that can be assigned dynamically to various nodes, depending on demand. There are three broad categories of resources: compute, memory, and I/O. A node can be or represent a collection of processing elements coupled with memory and I/O that runs a single system image (such as BIOS or VMM or OS). In some cases, a pool of memory can be dynamically allocated to different nodes. Further, this pool of memory (as illustrated in previous examples above) can be distributed and managed by multiple different memory controllers, such as shared memory controllers (SMCs). Each node can connect to one or more SMCs, each SMC acting as an aggregator and connecting to a respective portion of the pooled memory, using an interconnect such as a buffered memory link interconnect, a shared memory link interconnect, or other interconnect adopting at least some of the principles described above. Each node can communicate with an SMC to access a part of this pool using normal memory Load/Store (LD/ST) semantics. In some cases, nodes can optionally cache the memory in its local cache hierarchy.

Addressing memory within a pooled memory system can be challenging, particularly in cases where dynamic allocation (and reallocation) of memory resources to different nodes is desired, among other examples. In one embodiment, an address map for a pooled memory system can be implemented as a set of range registers and/or a as a translation lookaside buffer (TLB) (e.g., with the page table backed up by a portion of the shared memory resources in the pooled memory). An address mapping mechanism is described that can comprehend different views of address maps among the nodes while keeping them consistent with at the entire rack level.

Having a memory pool that can be dynamically assigned to various nodes offers multiple advantages. For instance, memory upgrade cycles can be independent of CPU upgrade cycles. For example, the memory pool can be replaced after multiple CPU upgrades, providing significant cost savings to the customer. As another example, memory can be allocated in a more cost-effective manor, particular as memory capacity increases significantly with the next generation non-volatile memory technologies. For example, the DIMM size may be 256 GB to 1 TB, but a micro-server node may only use 32 to 64 GB of memory. The pooling mechanism can enable fractional DIMM assignment to nodes. As other example advantages, memory can be flexibly allocated based on node demand, memory pooling can enable power efficiency as overprovisioning of each node with the maximum memory capacity can be avoided. Further, high compute density due to memory being dis-aggregated from compute can be realized, as well as memory sharing between independent nodes in a rack level system, among other example advantages.

Figure 12:
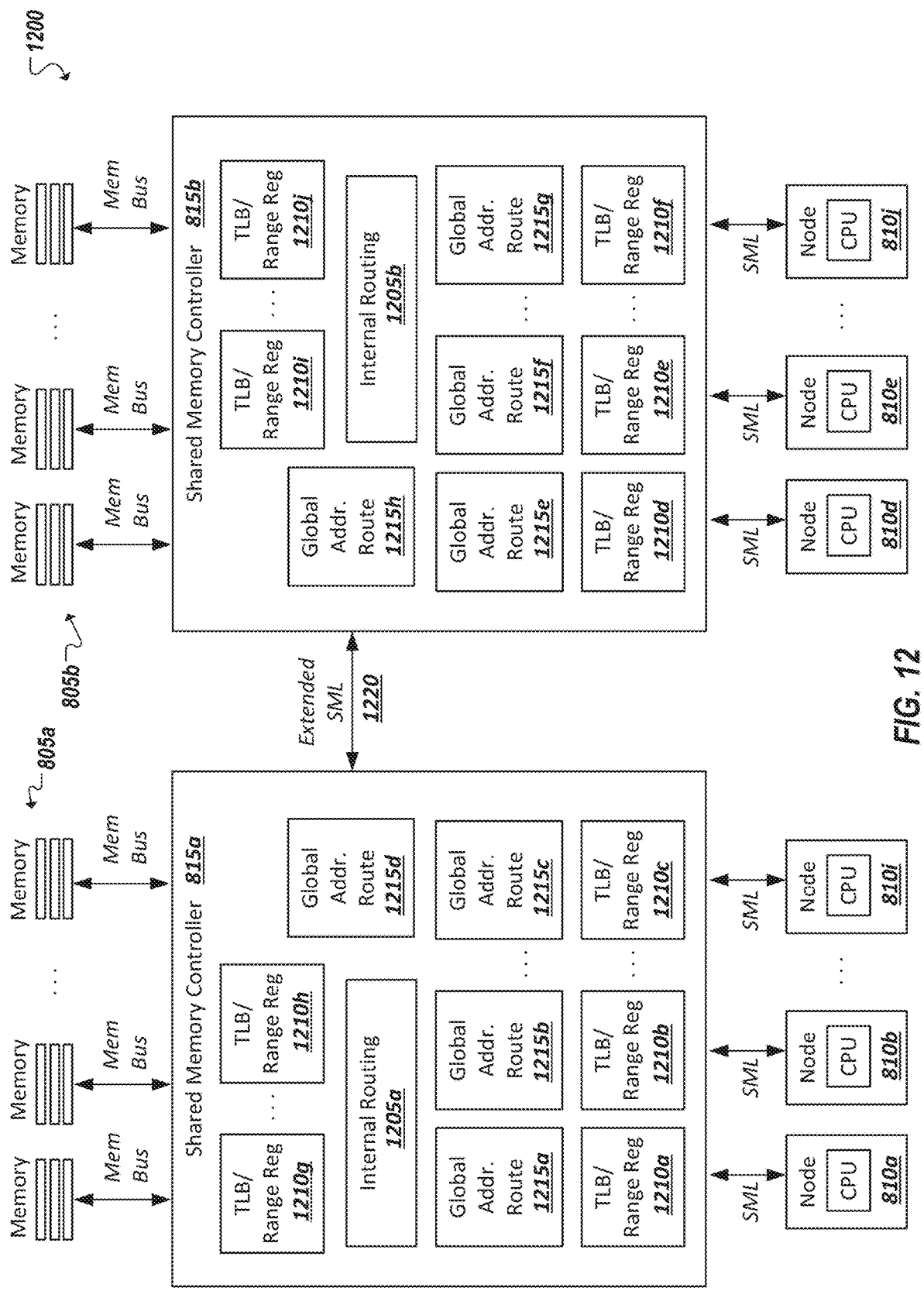
FIG. 12 illustrates a simplified block diagram of an embodiment of an example system including a plurality of shared memory controllers.

Turning to the simplified block diagram 1200 of FIG. 12, each node (e.g., 810a, 810b, 810d, 810e, 810i, 810j) in a system can be an independent entity with its own view of a memory map in a pooled and shared memory architecture. Memory translation services can be used to translate the memory map seen by each node, as an independent entity, to a consistent memory map as it is managed at an entire, or global, system level that includes all of the nodes and shared pool of memory in the system. Translation structures (e.g., 1210a-j) can be provided to allow an SMC (e.g., 815a, 815b) to translate address values referenced by individual nodes (e.g., 810a, 810b, 810d, 810e, 810i, 810j) in their respective memory access requests from the independent node-specific address domain to global address values for the pooled memory domain. In some instances, address translation structures 1210a-j can include range registers defining translations for specific fixed ranges of the node's memory map, TLBs caching uniform page ranges of address translations, or a hybrid/combination of both. In some instances, distinct translation structures (e.g., 1210a-j) can be provided for each link of the SMC (as shown in the example of FIG. 12). In other instances, a single translation structure of the SMC can be shared by multiple links, among other example configurations.

As noted above, and in other examples, a plurality of SMCs can be provided to control direct LD/ST access by a plurality of nodes according to shared memory link protocols. Each SMC (e.g., 815a, 815b) can connect to multiple independent nodes (e.g., 810a, 810b, 810d, 810e, 810i, 810j) using SML links, each capable of handling memory semantics with directory bit support. Each SMC may connect to a portion of a pool of memory (e.g., 805a, 805b) through one or more memory buses. The memory connected to each SMC may be accessible to any node nodes connected to that or another SMC. This can be facilitated by interconnecting the multiple SMCs (e.g., 815a, 815b) of a system into a network of SMCs using expanded SML links (e.g., 1220). Expanded SML links 1220 may be defined according to protocols for routing nodes' requests for pooled memory between two or more of the multiple SMCs (e.g., 815a, 815b) to allow the requests (and responses) to be handled by the particular SMC that controls the line of memory requested by the node. Expanded SML links, for instance, may expand upon or augment packet or flit formats used in standard SML (which focuses on facilitating direct communication between a single node and SMC in a buffered memory arrangement), such as described in U.S. patent application Ser. No. 14/670,578, filed on Mar. 27, 2015, entitled "Shared Buffered Memory Routing," incorporated herein by reference in its entirety.

Accordingly, routing logic can be provided at each SMC 815a, 815b. Such routing logic can include, for instance, internal routing logic 1205a, 1205b to facilitate routing of requests to "local" memory elements in instances where the translation structure indicates that the SMC has direct access to a particular line of pooled memory (i.e., hosted on a memory element directly connected to the SMC. The SMC can also include global address routing logic (e.g., 1215a-h) that can determine, from the global address translation, that a request (or response) is to be routed to another, "remote" SMC (i.e., an SMC (e.g., 815a) to which the node (e.g., 810d) is not connected).

Figure 13:
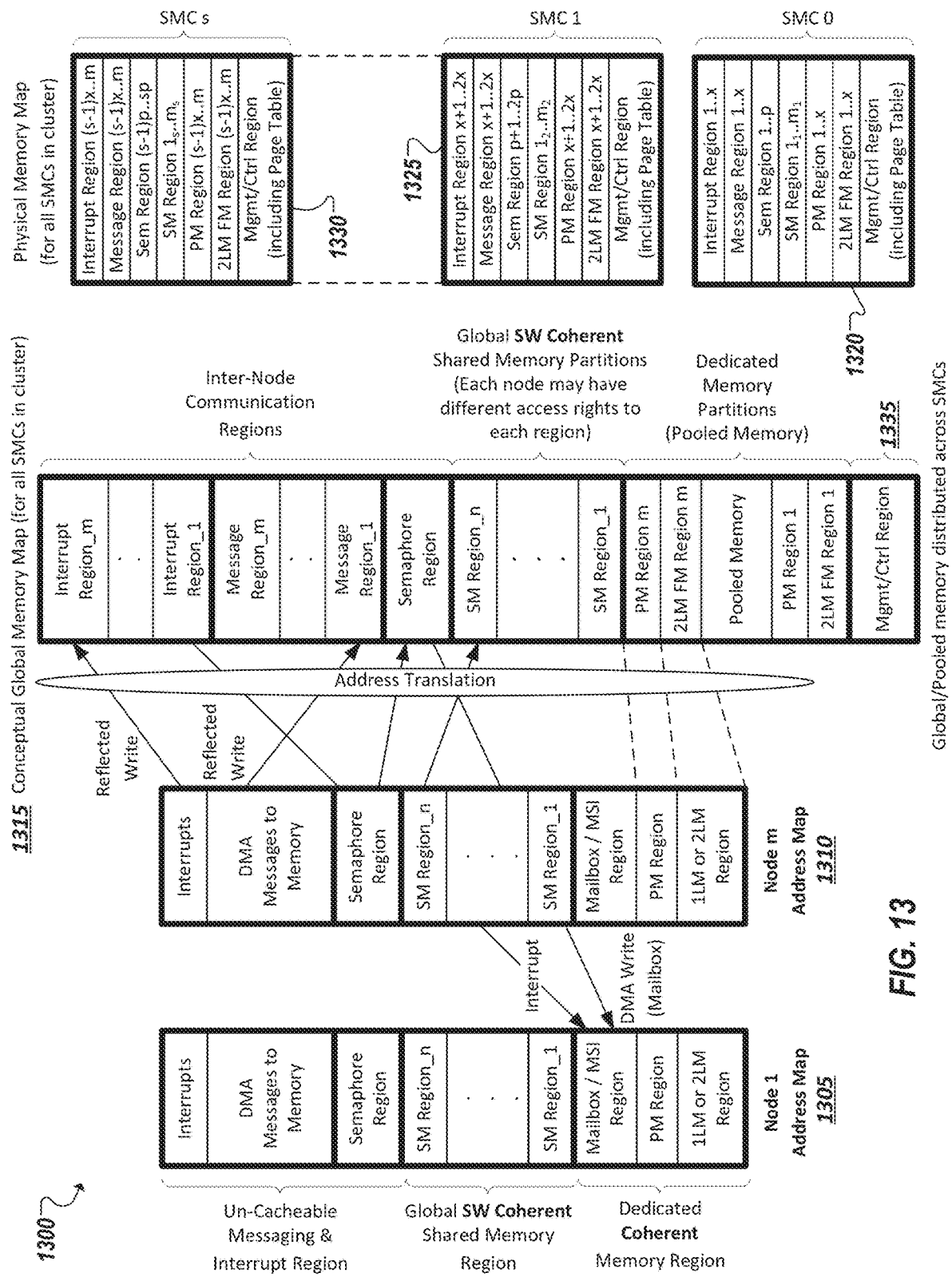
FIG. 13 illustrates a representation of example address maps.

FIG. 13 illustrates a representation 1300 of multiple independent node address maps (e.g., 1305, 1310) in relation to a global address map (e.g., 1315) of a pooled memory. The pooled memory can include multiple portions (e.g., 1320, 1325, 1330) managed by multiple different shared memory controllers. When multiple independent nodes are connected to a pool of memory through SMC(s), there exists the challenge of reconciling the nodes' independent views of the address map. Since each node is an independent domain, it has its own independent address map (e.g., 1305, 1310) as shown in FIG. 13. For example, any given address value (e.g., address=0) may be present in each node's address map, although the same address value in two different node address maps (e.g., 1305, 1310) may reference a different line in the pooled memory. Further, as each node is independent, it may be ignorant or agnostic to the presence of the global pooled and shared memory space, the presence of multiple SMCs, and/or other nodes. Each node may think the addresses in its own address map each correspond to its "own" memory addresses and may be ignorant that these lines of memory are part of a shared and/or pooled memory resource.

In the specific example of FIG. 13, a first node may consider a first address map 1305 that outlines various types of memory. For instance, the first node may possess dedicated coherent memory that is private to the first node, such as a one level (1LM) or two level memory (2LM), a persistent memory (PM) region (e.g., that does not lose content across power cycles or resets), and a corresponding mailbox or MSI region. The node may also maintain addresses for a global software coherent shared memory region, including various lines or blocks (e.g., 1 through n) of shared memory. Further, a node can maintain addresses for an uncacheable messaging and interrupt memory region (including a semaphore region). Other nodes may also address (e.g., at 1310) similar regions of private and shared memory. In the case of shared memory, multiple nodes may maintain respective (albeit different) addresses for the same lines of memory. In the case of private memory, only the node to which the private memory belongs may address these lines. However, while it is possible that all of the private memory addresses in a node's view of the address map are hosted in memory controlled by the SMC connected to that node, it can also be the case that private memory is distributed among the memory pool, including in memory elements hosted by SMCs to which the node is not connected. Further, as multiple different nodes may address different lines of the pooled memory with the same address value, a conceptual global memory map 1315 can be maintained for the system to summarize all of the lines of memory controlled by the multiple SMCs in the system. Each line (and correspond address) of memory in an individual nodes view of the memory can correspond to a global address within the global memory map. In one example, shown in FIG. 13, a dedicated (or private) memory partition of can be defined in the global memory map and include the dedicated memory of each node in the system (e.g., PM region m, a two level memory (2LM) far memory (FM) Region m, PM region 1, 2LM FM Region 1, and corresponding dedicated memory of every other node in the system, etc.). Shared memory regions can be addressed globally in a global software coherent shared memory partition. While each node may have a view of this shared memory, different nodes may have varying access rights to each shared memory region or line, among other examples. Further, internode communication regions can be mapped globally, for use by nodes to send interrupts and messages to other nodes, among other uses. Further, a management and control region 1335 can be maintained with data describing the various nodes and SMCs within the system, as well as, in some cases, with data embodying address translation structures, such as global pages tables, among other examples. In some implementations, access to the management and control region 1335 may be limited to a system management entity.

In some implementations, for addresses that physically exist in the pooled memory off the various SMCs of the system, each node's address can be translated from the individual node address space (e.g., 1305, 1310) to a global address space (e.g., at 1315). The global address map may present itself as a flat global address space, as if existent on a single SMC. In the non-limiting example presented in FIG. 13, an example global address space is represented that begins (e.g., at address=0) with the management/control region 1335. This block can be followed by each node's dedicated region and may be organized (and addressed) in contiguous chunks for each node (e.g., all of the dedicated memory of Node 1 is followed by all of the dedicated memory of Node 2, and so on). Dedicated memory may be subdivided based on the memory characteristics of the memory (e.g., persistent vs volatile). All the shared, or "global," regions that may be accessible by all the nodes can be follow the dedicated memory, and so on. Global shared memory can include the shared memory regions, semaphore region, message and interrupt regions, and so on.

In real systems, there may be multiple SMCs that pool a larger chunk of memory that any of the nodes (connected to those SMCs) may get access to. Further, while it may make sense to have the node private region in the SMC directly connected to the node for optimal performance, there can be cases where that may not be the case. For example, global memory (including the inter-node communication regions) can be distributed across SMCs since they belong to all the nodes in the system (as opposed to the local set that are directly connected to one SMC). Also for capacity reasons, it may not be always possible to assign even a private region in the closest SMC. A third example may be a virtual machine (VM) that migrates from one node to another in a different SMC. In such an instance, the associated memory may stay in the original SMC for a while before being migrated. In order to support these, the global address may be assigned to where each SMC gets a contiguous chunk. Each chunk then hosts parts of the regions such as management/control, dedicated regions, and shared regions in a non-overlapping manner that covers the entire region, as shown in FIG. 13. Local storage of dedicated memory, in this example, is accommodated, with the dedicated memories of nodes connected to SMC0 being stored in the physical memory 1320 of SMC0, the dedicated memories of nodes connected to SMC1 stored in physical memory 1325 of SMC1, and so on. Further, the management control region can also be distributed among the physical memories (e.g., 1320, 1325, 1330) managed by multiple different SMCs, as shown in the example of FIG. 13.

As noted above, address translation within a system that supports direct LD/ST to a pool of memory accessible by multiple nodes can utilize address translation structures such as a set of range registers and/or page tables (TLBs). Range registers and TLBs can be used independently or jointly. Each incoming direct LD/ST (or other memory) transaction from a node can undergo translation from the node address originally referenced by the node in the transaction to the global address. After obtaining the global address, routing can be performed by the SMC to identify the destination SMC/memory controller managing the memory element hosting the line of memory at the global address. Transactions involving routing to another SMC (e.g., over an expansion shared memory link), as well as inside the SMC can reference the global address returned from the translation. In some instances, the SMC may replace or augment address information received in a flit or packet from the node with the global address (e.g., in accordance with an expansion SML protocol), and use the global address when forwarding the corresponding flit(s) or packet(s) to other SMCs. For instance, global address routing logic can be provided in each SMC (and in some cases for each link of the SMC) in connection with not only expansion shared memory links interconnecting the SMC to other SMCs, but also within the internal routing logic of the SMC for use in transactions involving "internal routing" within the SMC (e.g., for lines of memory (e.g., 805*a*) directly accessible to the SMC (e.g., 815*a*)). Further, a memory translation service can also be provided from the memory controller side to obtain node addresses in order to route inter-node communication transactions, among other examples.

Figure 14:
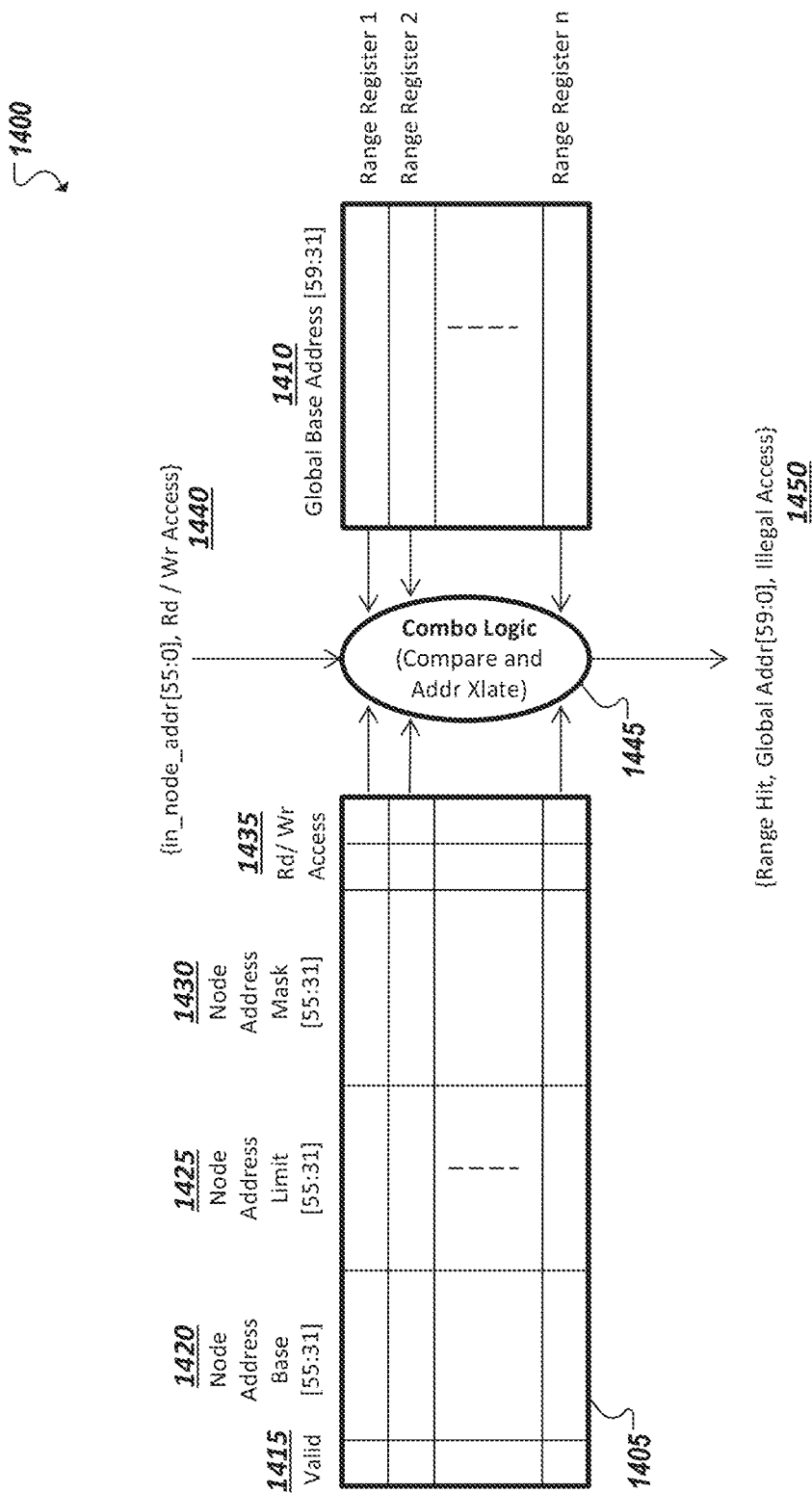
FIG. 14 illustrates a representation of an example address translation structure.

FIG. 14 shows a representation of an example implementation of a set of range register for a particular link of an SMC. In some instances, one or more sets of range registers can be provided for each node to which the SMC is connected. In other implementations, a single set of range register can be maintained and shared for multiple (or all links) of the SMC (for multiple nodes directly connected to the SMC), with an additional column in the register indicating the corresponding link identifier (ID) (and node) to which each register line corresponds, among other examples.

In the example of FIG. 14, range register address translation can rely on a fixed set of range registers 1405, with a single set being provided for each link connecting the SMC to a corresponding node. In one example, the format of each register can include columns or fields such as {Valid, Node Base Address[55:31], Node Limit Address [55:31], Read Access, Write Access, Global Base Address[55:31]}. Other examples may add to or do without one or more of these example fields. A Valid field 1415 can indicate whether the addresses in a particular range are valid (e.g., whether the addresses in that range have been programmed). The Node Base Address can indicate a start to the range and the Node Limit Address can indicate an end of the range. In this example, the Node Base and Limit Addresses can have a 2 GB granularity. Other implementations may choose a different width for the Node Base and Limit Addresses to provide a smaller or larger granularity. While the granularity is fixed by the number of bits chosen for the Node Base and Limit Addresses in the register, in some implementations, a Node Address Mask 1430 (e.g., Node Address Mask [55:31]) can be provided to allow the granularity to be adjusted downward, among other examples.

A range register (e.g., 1405) can include additional fields, such as read and write access fields 1435. The read and write access fields can each be a single bit respectively representing whether a node (to which the ranger register corresponds) has read and/or write access to addresses in that range. In some cases, the read and write access fields can be adjusted (e.g., by a software manager) to permit access levels to be enhanced (or decreased), among other examples. Each range register can map to a similarly sized corresponding contiguous range of the global memory (e.g., indicated by Global Base Address [59:31] 1410). The Global Base Address [59:11] can be compared (e.g., with compare and address translation logic 1445) with the corresponding Node Address Base [55:31] value to determine an offset between the node's addressing of the range and the global address for the same range.

In practice, the example set of range registers 1405 of FIG. 14 can be utilized to translate a node address into a corresponding global address as well as determine the access rights of a node to that address. For instance, an incoming node request {in_node_addr[55:0], Rd/Wr Access} can be received that indicates the particular address of line of memory requested by a particular node as well as the type of access (e.g., read or write) requested. Compare and address translation logic 1445 can determine which range the particular address falls within and read a corresponding range register to determine whether the access type is permitted for that range as well as the offset to be applied to the particular node address to translate the particular node address into its corresponding global address. The compare and address translation logic 1445 can return a result 1450 indicating, for instance, whether a range was found for the particular node address, the global address translation of the particular node address, as well as whether the requested access was "legal" or "illegal" (in the example of FIG. 14, the access is determined to be illegal based on the read write access values 1435 in the register for the range corresponding to the received transaction (e.g., 1440).

In one example, compare and address translation logic 1445 can utilize an algorithm for each range register entry for an incoming address from the node (in_node_addr):

--- if ((Valid == 1b) && ((in_node_addr[55:31] & Node Address Mask[55:31])>= Node Base Address base) && (in_node_addr[55:31] < Node Limit Address[55:31])) then /*
Range Hit =0b by default for each entry
   Range Hit = 1b;
   Illegal Access =0b;
   Global Address [59:0] = {Global Base Address [59:56], ((Global Base Address
   [55:31] & Node Address Mask[55:31]) | (in node_addr[55:31] & ~Node Mask
   Address[55:31])), in_node_addr[30:0]};
   If ((incoming transact ion is read and (Read Access = 1b)) || (incoming transaction
   is write and (Write Access = 1b))) then Illegal Access = 1b;

---

In an alternative example, the incoming address limit register value can be removed and the mask_address can be used instead to allow the number of comparators in hardware (e.g., of the compare and address translation logic 1445) to be reduced. In such an example, the compare operation in the above algorithm can be simplified to:

--- if ((Valid == 1b) && ((in_node_addr[55:31] & Node Address Mask
[55:31]) == Node Base Address [55:31]) then....

---

The range register approach can be a relatively simple implementation of an address translation structure in hardware and can be implemented without any system memory resources. Range registers, however, may be limited in their flexibility. For instance, the sizes of the ranges may not be able to be changed, once programmed, without quiescing the nodes corresponding to the range register. In such instances, range register implementations may have limited utility in memory hot-plug applications, memory migration, and virtual machine application, as changes to the range registers, after programming, can create holes in the address map. Further, the number of ranges may be fundamentally limited by the number of range registers present in the silicon and the size can be no smaller than the bits available within each register, among other example characteristics.

As an alternative to, or supplement for range registers, a page-table-based approach can be utilized as an address translation structure in a pooled memory architecture. The page-table-based approach can resolve some of the shortcomings of the range register approach. Accordingly, in some implementations, a hybrid approach can be implemented with some lines or ranges of memory being translated using range registers (e.g., lines of memory that are fixed or otherwise not likely to change) and other address lines (such as addresses corresponding to memory lines more likely to be modified or accessed), being translated using corresponding page tables. TLB page sizes can be programmed and may not change once the node is up and running. However, it is possible for different nodes to have different page sizes. Each SMC can cache a portion of the pages. Each node's incoming page address can be translated by a page table entry which resides in the system memory hosted by the SMC. Thus, contiguous pages in each node's address map, may not be assigned to contiguous pages in the global address map. This enables for memory to be easily added, removed, or moved, however, from one node to another node. For instance, memory can be moved by simply quiescing the traffic for the affected pages while the move is underway.

The global set of page tables can be maintained in system memory (such as in a management/control region (e.g., 1335) shared between multiple SMC's memory portions). In order to minimize performance loss (e.g., avoid increased latency as well as reduced effective memory bandwidth), a subset of the page table entries (of the full page table(s) stored in system management memory) can be cached in a TLB local to an SMC. A page table with TLB approach can provides flexibility for memory allocation and deallocation. New page table entries can be added to (or replace other entries) in the TLB cache, as needed, by the SMC hardware to keep up with the access patterns using a cache replacement policy such as LRU (Least Recently Used).

Figure 15:
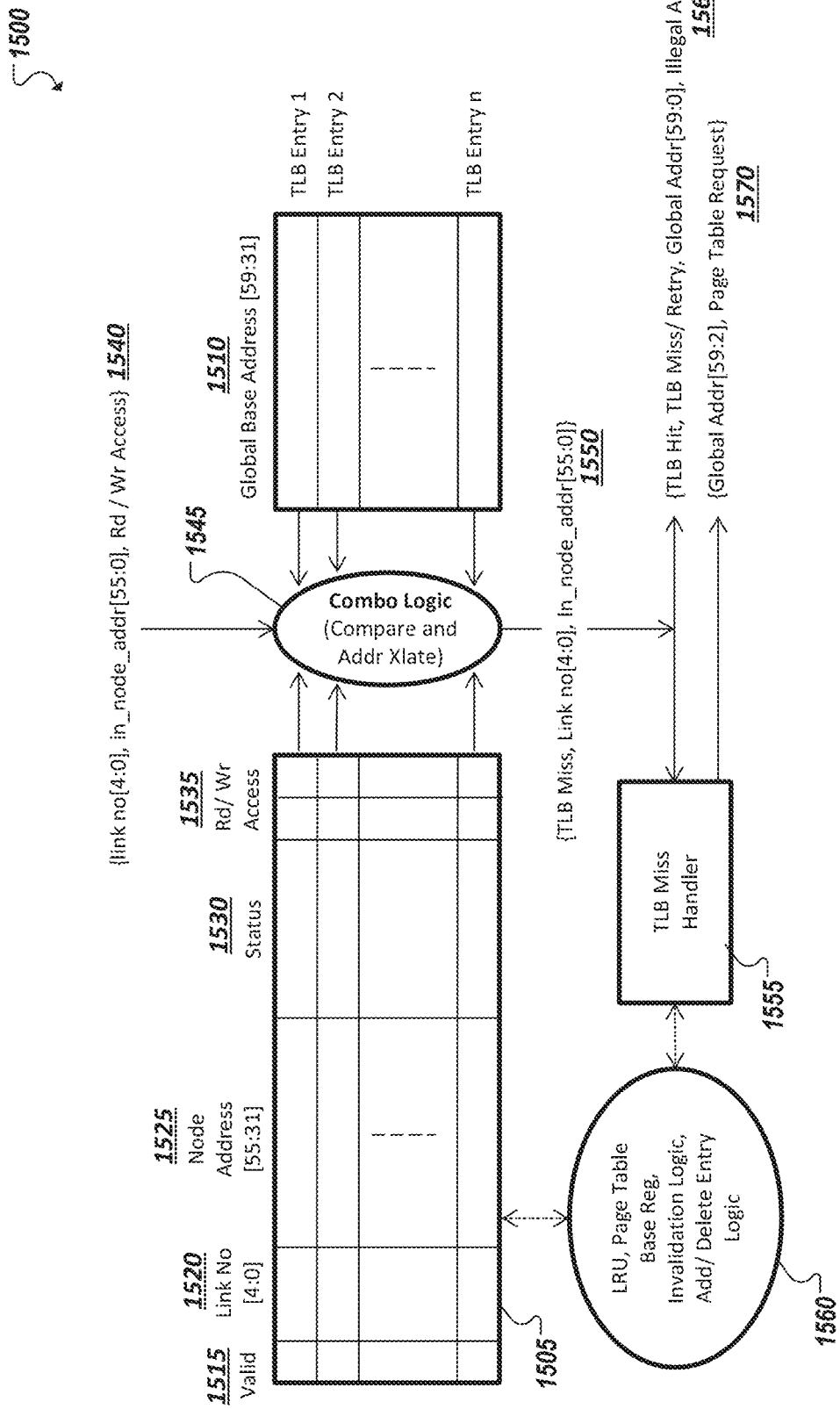
FIG. 15 illustrates a representation of another example address translation structure

Turning to the simplified block diagram 1500 of FIG. 15, an example representation of a TLB implementation is shown. A TLB 1505 can be provided with fields similar to that provided in a range register. For instance, in this particular example, each TLB entry can include a Valid field 1515, a Node Address field 1525, a Status field 1530, and Read/Write Access fields 1535. As with range registers, a TLB can be provided on a per SMC or per SMC link (or node) basis. In the example of FIG. 15, the TLB 1505 is shared between multiple SMC links (and nodes connected to the SMC). Accordingly, an additional Link Number field 1520 can be provided to indicate the particular link to which each TLB entry corresponds. Additionally, in some implementations, each entry of a given page table (and thus each corresponding TLB entry) can be of a uniform length (e.g., 256 MB, 1 GB, etc.). Accordingly, an address limit field can be foregone, as the end of the range can be simply determined based on this fixed length. The Status field can be used to identify various aspects of the range, such as the last time the range was accessed (e.g., for use by a TLB entry replacement or updating algorithm), various stages of migration in case memory migration is supported, etc.

As with range registers, each TLB entry can map to Global Base Address value 1510 allowing an offset to be determined for each address falling within a given TLB entry. Compare and address translation logic 1545 can be provided to process incoming requests (e.g., 1540) and translate a node address ("in_node_Addr[55:0]") into its corresponding global address. In some implementations, at least a portion of the compare and address translation logic (1445) for use with range registers can be reused in (or overlap) the compare and address translation logic 1545. Further, a TLB miss handler 1555 and additional page table handling logic 1560 can be provided to assist in address translations using the TLB 1505. For instance, page table handling logic 1560 can include logic, implemented in hardware and/or software, for determining least recently used (LRU) entries, base register values, invalidation logic, add/delete TLB entry logic, as well as potentially other logic to implement features and functionality for use with a TLB-based address translation.

In the particular example illustrated in FIG. 15, a request 1505 can be received at an SMC (from a node) that includes the node address of the requested line of memory. The request 1505, in this example, can also include a link number and an identification of the type of request (e.g., whether read or write access to the line of memory is requested). Compare and address translation logic 1545 can determine which (if any) TLB entries (or, alternatively, range registers) include the node address. The result (e.g., 1565) of the compare can be used to update status of the range and, in cases where a miss results, to trigger a lookup by the miss handler 1555 to obtain the TLB entry and update TLB 1505. not only to indicate w If a corresponding TLB entry is identified, compare and address translation logic 1545 can then determine an offset to apply to the memory address to convert the node address to the corresponding global address. As noted above, in some cases, the address will not map to the SMCs TLB (or range registers). In such cases (i.e., a TLB "miss"), TLB miss handler 1555 can fetch a page table entry (e.g., 1570) from a corresponding page table stored in system management and control memory and populate the TLB with an entry of the range in which the address falls. Additional TLB logic (e.g., 1560) can determine how to update the TLB, including whether to drop underused entries, whether to use pooled memory connected to the SMC as an overflow for the TLB, how to add the new entry, etc. The updated TLB entry can then be used to perform the address translation. In some cases, latency introduced through the updating of the TLB handling can be reflected in the Status field 1530 of the TLB 1505, causing the address translation attempt to be retried (and allow an intervening TLB lookup request to proceed without creating a backlog behind the request that resulted in the TLB miss).

In some implementations, each incoming node SML connecting the SMC to respective local nodes can include a range register pointing to a global memory offset (pag- e_table_base) where the page table for that link resides. The page table for the node can be contiguous in the physical memory for ease of implementation. The page table can set up by system management software and may only be directly accessible by it (i.e., nodes cannot directly access it). Each page table entry can be a 4B entry: {global base address[59:31], Rd Access, Wr Access, Status}. The Node (page) Address can be implied in the offset from the page_table_base since the locations are contiguous. For an incoming address that misses the TLB, the page table entry can be found in:

in_node_address[55:31]*4+page_table_base.

It should be appreciated that the implementations described herein are provided as examples to illustrate certain principles and features disclosed in the Specification. It should be appreciated that alternative configurations, protocols, and architectures (other than those specifically discussed in the examples) can utilize and apply such principles and features. As an example of one alternative, PCIe memory read/write can be used (e.g., instead of a defined buffered memory protocol (e.g., SML)) that is enhanced with directory information. The directory information can be implemented through reserve bits of the PCIe packet. In another example, CPU nodes can utilize a cache controller (e.g., as an alternative to a shared memory controller) to send memory read/write transactions on a PCIe link, for instance, based on a remote address range check, among other potential examples and alternatives. In another example, while certain page table sizes (e.g., 2 GB), address sizes, range register widths, translation structure formats, etc., have been described in certain examples herein, it should be appreciated that these are presented for purposes of illustration only and are not to limit other alternative implementations that utilize apply the more general principles and features disclosed herein.

Figure 16A:
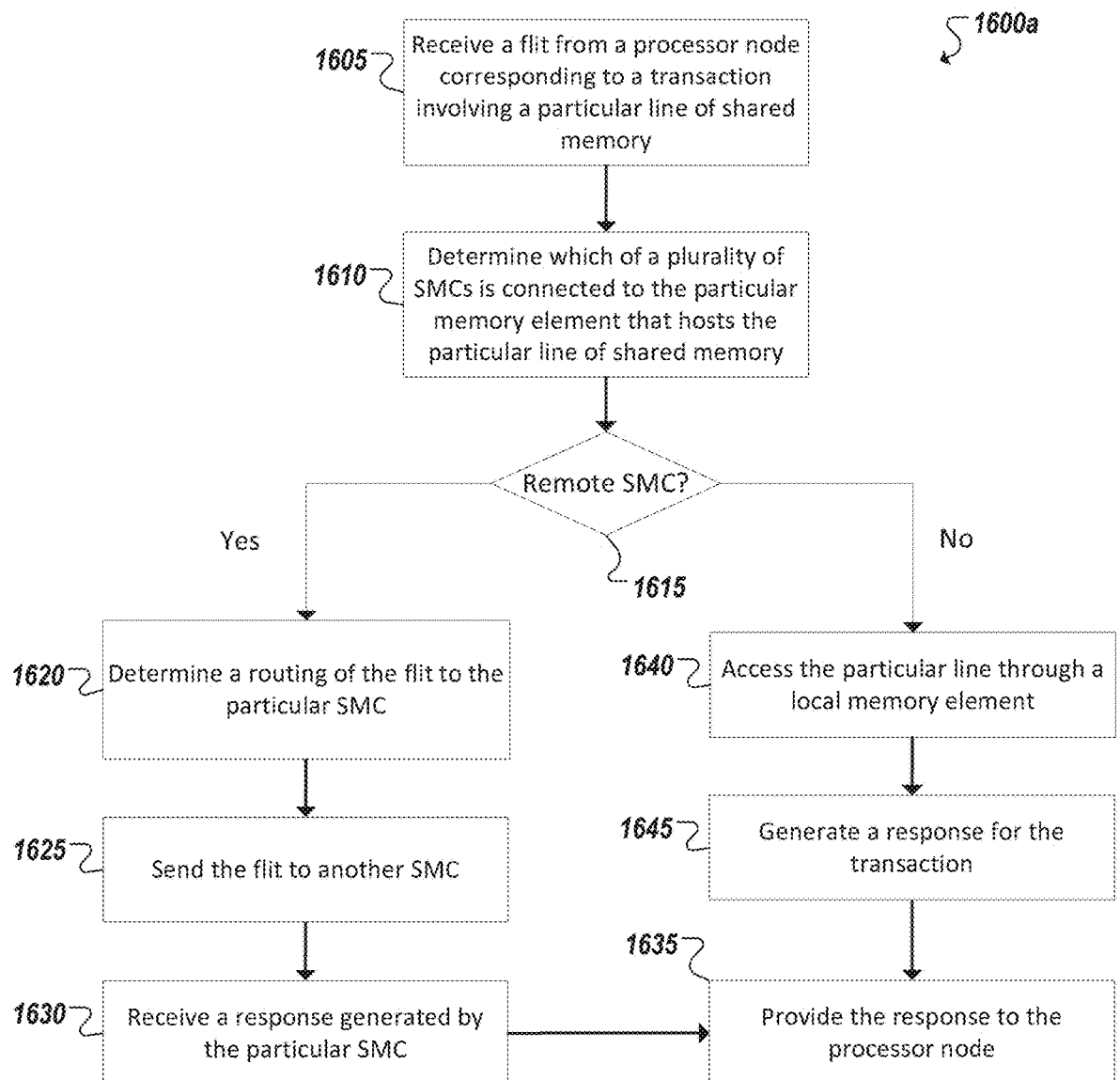
FIGS. 16A-16B are flowcharts illustrating example techniques for routing transactions within a shared memory architecture.
Figure 16B:
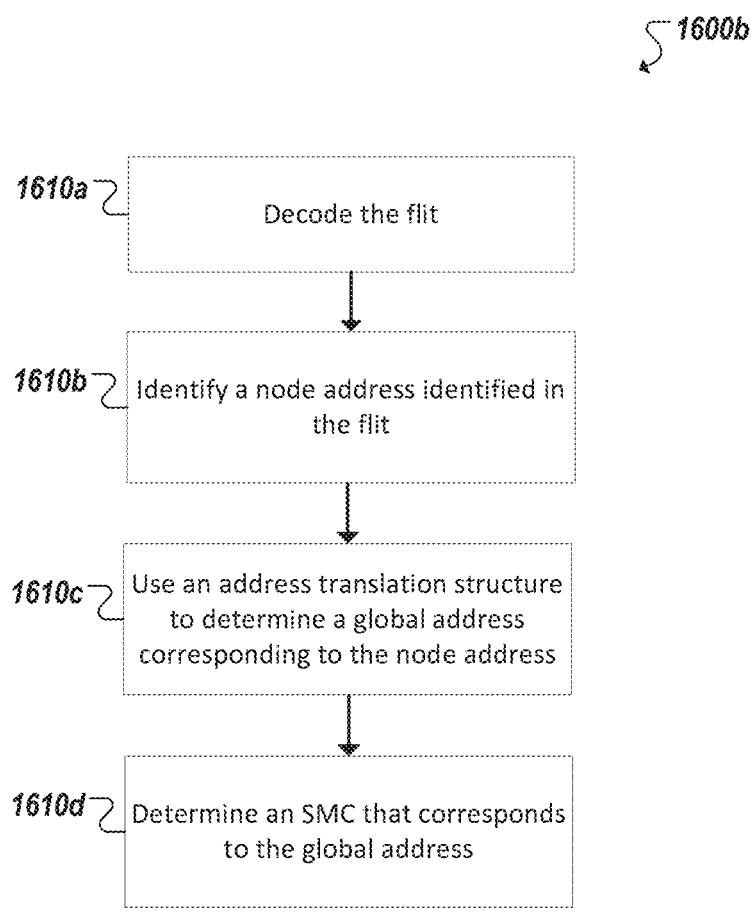

Turning to FIGS. 16A-16B, flowcharts 1600a-b are shown illustrating example techniques for communicating using a shared memory link interconnect. For instance, in FIG. 16A, a load/store memory access message can be received 1605 at one of a plurality of shared memory controllers (SMCs) (e.g., over an SML link) from a processor node, the message requesting data of a particular address of shared memory. The message can be embodied in one or more flits, including a header flit to identify the particular address. The shared memory controller can determine 1610 from the particular address (or a destination node identifier identifying a particular one of the SMCs), that the message (or "request") is to be handled by the particular SMC because the particular SMC manages a particular one of the shared memory elements in the system that hosts the particular address. In some cases, the SMC connected directly to the processor node is the particular SMC. In other cases, the particular SMC is another one of the plurality of SMCs. The SMC can determine whether it or another one of the SMCs is to handle the request (e.g., at 1615).

Turning momentarily to FIG. 16B, determining 1610 the proper destination SMC for a given transaction can involve translation of a node address (according to the node's independent address map) into a global address, as discussed above. For instance, the received flit can be decoded 1610a to identify 1610b a node address value included in the flit. The SMC can then use an address translation structure to determine 1610c a global address that corresponds to the node address included in the flit. In some implementations, the address translation structure can include one of or a combination of both a set of range registers and a page table TLB at the SMC. From the global address, the SMC can be identified that hosts (or "manages" or "controls") the line of memory corresponding to the global address. From the global address, an SMC can determine which SMC in the system hosts that address (along with which memory bus) and the request can be routed accordingly. In some cases, the SMC number (e.g., identifier) can be included in the upper bits of the global address itself to assist in mapping SMCs to particular addresses. Further, in some cases, the SMC may determine that the global address corresponds to a line of memory it controls, while in other cases the SMC may determine that another SMC controls the line of memory corresponding to the global address.

Returning to the discussion of FIG. 16A, in cases where the SMC determines that another SMC is the particular SMC for handling the request, the SMC can determine 1620 how to route the request to the particular SMC (over an expanded SML link). In some cases this can involve sending the request to an intervening one of the plurality of SMCs (e.g., between the SMC and the destination SMC determined from the address translation). In other cases, the SMC can determine that the routing involves sending the request directly (e.g., over a single SML link) to the particular other SMC. The SMC then sends 1625 the request (e.g., over an SML link) to the other SMC (either the particular SMC or intervening SMC). In some implementations, the format of the flit used by the processor node in its request may be augmented by the SMC to facilitate routing of the flit within a network of SMCs. For instance, the SMC may utilize one of a plurality of slots to extend an address indicated by the processor node, add a source or destination node identifier to indicate the source or destination SMC in the transaction, encode bits to indicate that the particular flit slot is being used for these purposes, among other modifications.

Once the particular SMC accesses the particular line of shared memory corresponding to the particular address, the particular SMC can send a response back to the SMC connected to the particular node. The response can include enhanced fields (such as those included in the request flits) that are used to assist in routing the response back to the source SMC (e.g., the source node ID). After being routed back along the same or a different path within a network of SMCs, the SMC connected to the particular node can receive 1630 a response generated by the particular SMC and can provide 1635 the response to the processor node. In cases where the flit format used between the SMCs represents an augmented version of a flit consumed by the processor node, the SMC can strip "extra" or enhanced fields from a response flit before providing 1635 the response to the processor node. The response may appear to the processor node as having been handled entirely by the SMC it is connected with. In other words, the node may be ignorant of that fact that the line of memory is managed by another SMC and that the request was routed over one or more other SMCs in a network of SMCs in a shared memory architecture.

In cases where the SMC determines (e.g., at 1615) that it manages the memory element hosting the requested line of memory, the SMC can access 1640 the particular line of memory from the memory element, generate the response 1645, and provide 1635 the response to the processor node.

It should be noted that while much of the above principles and examples are described within the context of PCIe and particular revisions of the PCIe specification, the principles, solutions, and features described herein can be equally applicable to other protocols and systems. For instance, analogous lane errors can be detected in other links using other protocols based on analogous symbols, data streams, and tokens, as well as rules specified for the use, placement, and formatting of such structures within data transmitted over these other links. Further, alternative mechanisms and structures (e.g., beside a PCIe LES register or SKP OS) can be used to provide lane error detection and reporting functionality within a system. Moreover, combinations of the above solutions can be applied within systems, including combinations of logical and physical enhancements to a link and its corresponding logic as described herein, among other examples.

Note that the apparatus', methods', and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

Figure 17:
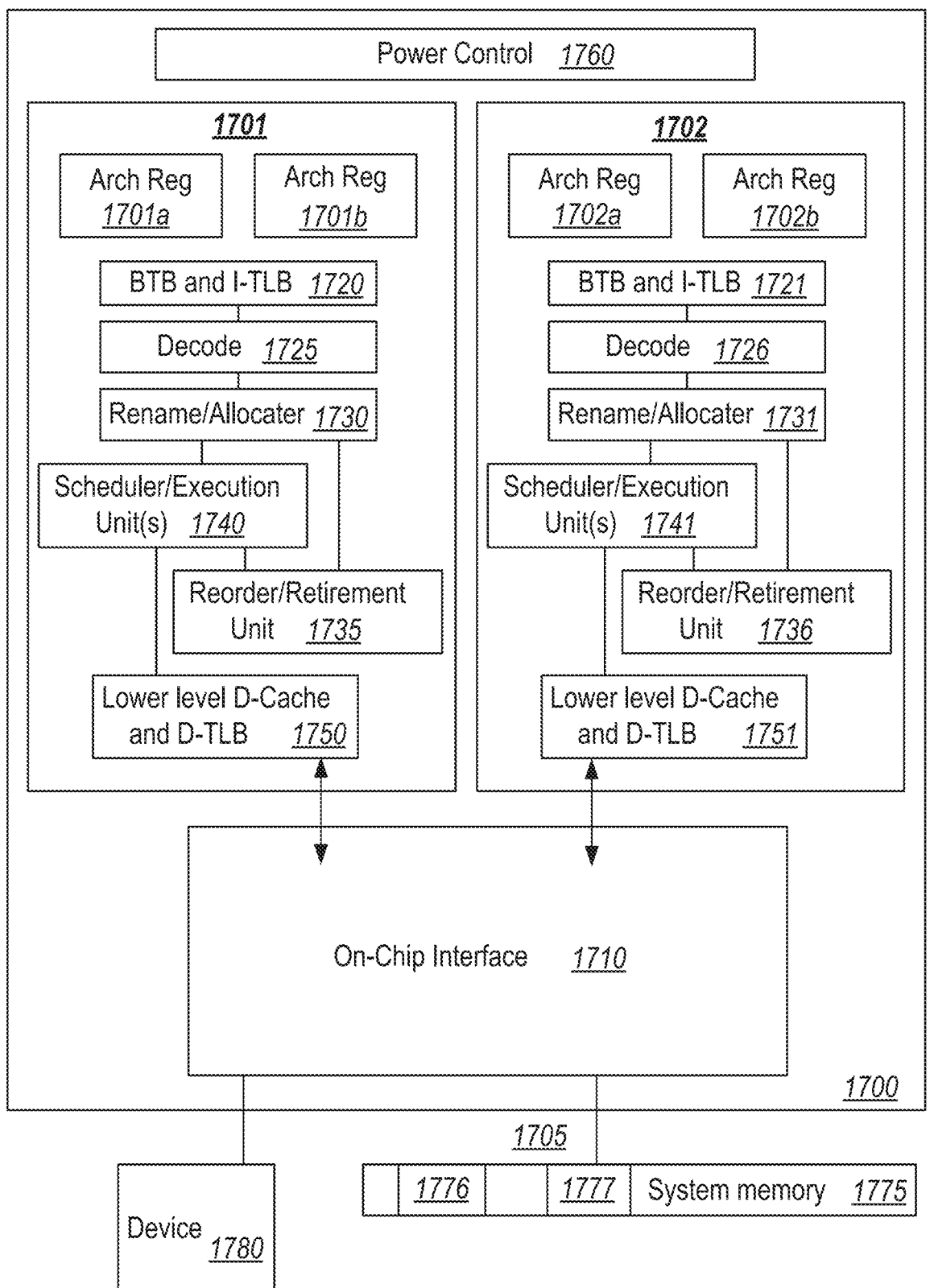
FIG. 17 illustrates an embodiment of a block diagram for a computing system including a multicore processor.

Referring to FIG. 17, an embodiment of a block diagram for a computing system including a multicore processor is depicted. Processor 1700 includes any processor or processing device, such as a microprocessor, an embedded processor, a digital signal processor (DSP), a network processor, a handheld processor, an application processor, a co-processor, a system on a chip (SOC), or other device to execute code. Processor 1700, in one embodiment, includes at least two cores—core 1701 and 1702, which may include asymmetric cores or symmetric cores (the illustrated embodiment). However, processor 1700 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1700, as illustrated in FIG. 17, includes two cores—core 1701 and 1702. Here, core 1701 and 1702 are considered symmetric cores, i.e. cores with the same configurations, functional units, and/or logic. In another embodiment, core 1701 includes an out-of-order processor core, while core 1702 includes an in-order processor core. However, cores 1701 and 1702 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 1701 are described in further detail below, as the units in core 1702 operate in a similar manner in the depicted embodiment.

As depicted, core 1701 includes two hardware threads 1701a and 1701b, which may also be referred to as hardware thread slots 1701a and 1701b. Therefore, software entities, such as an operating system, in one embodiment potentially view processor 1700 as four separate processors, i.e., four logical processors or processing elements capable of executing four software threads concurrently. As alluded to above, a first thread is associated with architecture state registers 1701a, a second thread is associated with architecture state registers 1701b, a third thread may be associated with architecture state registers 1702a, and a fourth thread may be associated with architecture state registers 1702b. Here, each of the architecture state registers (1701a, 1701b, 1702a, and 1702b) may be referred to as processing elements, thread slots, or thread units, as described above. As illustrated, architecture state registers 1701a are replicated in architecture state registers 1701b, so individual architecture states/contexts are capable of being stored for logical processor 1701a and logical processor 1701b. In core 1701, other smaller resources, such as instruction pointers and renaming logic in allocator and renamer block 1730 may also be replicated for threads 1701a and 1701b. Some resources, such as re-order buffers in reorder/retirement unit 1735, ILTB 1720, load/store buffers, and queues may be shared through partitioning. Other resources, such as general purpose internal registers, page-table base register(s), low-level data-cache and data-TLB 1715, execution unit(s) 1740, and portions of out-of-order unit 1735 are potentially fully shared.

Processor 1700 often includes other resources, which may be fully shared, shared through partitioning, or dedicated by/to processing elements. In FIG. 17, an embodiment of a purely exemplary processor with illustrative logical units/resources of a processor is illustrated. Note that a processor may include, or omit, any of these functional units, as well as include any other known functional units, logic, or firmware not depicted. As illustrated, core 1701 includes a simplified, representative out-of-order (OOO) processor core. But an in-order processor may be utilized in different embodiments. The OOO core includes a branch target buffer 1720 to predict branches to be executed/taken and an instruction-translation buffer (I-TLB) 1720 to store address translation entries for instructions.

Core 1701 further includes decode module 1725 coupled to fetch unit 1720 to decode fetched elements. Fetch logic, in one embodiment, includes individual sequencers associated with thread slots 1701a, 1701b, respectively. Usually core 1701 is associated with a first ISA, which defines/specifies instructions executable on processor 1700. Often machine code instructions that are part of the first ISA include a portion of the instruction (referred to as an opcode), which references/specifies an instruction or operation to be performed. Decode logic 1725 includes circuitry that recognizes these instructions from their opcodes and passes the decoded instructions on in the pipeline for processing as defined by the first ISA. For example, as discussed in more detail below decoders 1725, in one embodiment, include logic designed or adapted to recognize specific instructions, such as transactional instruction. As a result of the recognition by decoders 1725, the architecture or core 1701 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1726, in one embodiment, recognize the same ISA (or a subset thereof). Alternatively, in a heterogeneous core environment, decoders 1726 recognize a second ISA (either a subset of the first ISA or a distinct ISA).

In one example, allocator and renamer block 1730 includes an allocator to reserve resources, such as register files to store instruction processing results. However, threads 1701a and 1701b are potentially capable of out-of-order execution, where allocator and renamer block 1730 also reserves other resources, such as reorder buffers to track instruction results. Unit 1730 may also include a register renamer to rename program/instruction reference registers to other registers internal to processor 1700. Reorder/retirement unit 1735 includes components, such as the reorder buffers mentioned above, load buffers, and store buffers, to support out-of-order execution and later in-order retirement of instructions executed out-of-order.

Scheduler and execution unit(s) block 1740, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1750 are coupled to execution unit(s) 1740. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1701 and 1702 share access to higher-level or further-out cache, such as a second level cache associated with on-chip interface 1710. Note that higher-level or further-out refers to cache levels increasing or getting further way from the execution unit(s). In one embodiment, higher-level cache is a last-level data cache—last cache in the memory hierarchy on processor 1700—such as a second or third level data cache. However, higher level cache is not so limited, as it may be associated with or include an instruction cache. A trace cache—a type of instruction cache—instead may be coupled after decoder 1725 to store recently decoded traces. Here, an instruction potentially refers to a macro-instruction (i.e. a general instruction recognized by the decoders), which may decode into a number of micro-instructions (micro-operations).

In the depicted configuration, processor 1700 also includes on-chip interface module 1710. Historically, a memory controller, which is described in more detail below, has been included in a computing system external to processor 1700. In this scenario, on-chip interface 1710 is to communicate with devices external to processor 1700, such as system memory 1775, a chipset (in some cases including a memory controller hub or shared memory controller to connect to memory 1775 and an I/O controller hub to connect peripheral devices), a memory controller hub, a northbridge, or other integrated circuit. And in this scenario, link 1705 may include any known interconnect, such as multi-drop bus, a point-to-point interconnect, a serial interconnect, a parallel bus, a coherent (e.g. cache coherent) bus, a layered protocol architecture, a differential bus, a GTL bus, or an SML link.

Memory 1775 may be dedicated to processor 1700 or shared with other devices in a system. Common examples of types of memory 1775 include DRAM, SRAM, non-volatile memory (NV memory), and other known storage devices. Note that device 1780 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1700. For example in one embodiment, a memory controller hub is on the same package and/or die with processor 1700. Here, a portion of the core (an on-core portion) 1710 includes one or more controller(s) for interfacing with other devices such as memory 1775 or a graphics device 1780. The configuration including an interconnect and controllers for interfacing with such devices is often referred to as an on-core (or un-core configuration). As an example, on-chip interface 1710 includes a ring interconnect for on-chip communication and a high-speed serial point-to-point link 1705 for off-chip communication. Yet, in the SOC environment, even more devices, such as the network interface, co-processors, memory 1775, graphics processor 1780, and any other known computer devices/interface may be integrated on a single die or integrated circuit to provide small form factor with high functionality and low power consumption.

In one embodiment, processor 1700 is capable of executing a compiler, optimization, and/or translator code 1777 to compile, translate, and/or optimize application code 1776 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1710 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. One or more embodiments may provide an apparatus, a system, a machine readable storage, a machine readable medium, a method, and hardware- and/or software-based logic (e.g., implemented in connection with a shared memory controller) to receive, from a computing node, a request associated with a memory transaction involving a particular line in a memory pool and including a node address according to an address map of the computing node, use an address translation structure to translate the first address into a corresponding second address according to a global address map for the memory pool, determine that a particular one of a plurality of shared memory controllers is associated with the second address in the global address map, and cause the particular shared memory controller to handle the request.

In one example, the particular shared memory controller is determined to be the shared memory controller (a "first" shared memory controller) and the first shared memory controller can access the particular line of memory from a particular memory element included in a portion of the memory pool controlled by the first shared memory controller and return a result to the computing node.

In one example, the plurality of shared memory controllers can include a network of shared memory controllers and each one of the plurality of shared memory controllers controls access to (or "hosts") a respective portion of the memory pool.

In one example, the particular shared memory controller is determined to be a second shared memory controller and the first shared memory controller is to route the request to the second shared memory controller.

In one example, the first shared memory controller further includes a second interface to forward the request to the second shared memory controller and receive a result for the request from the second shared memory controller, and the result is to be forwarded to the computing node over the first interface.

In one example, the particular shared memory controller is determined to be a second shared memory controller in the plurality of shared memory controller, the routing logic is further to determine a routing path to the second shared memory controller for the request, a third shared memory controller is included in the routing path, the first shared memory controller includes a second interface and the request is to be sent to the third shared memory controller over the second interface to route the request to the second shared memory controller.

In one example, the address translation structure includes a set of range registers.

In one example, the address translation structure includes a table lookaside buffer (TLB).

In one example, the address translation structure further includes a set of range registers.

In one example, a first portion of the node addresses of the address map of the computing node are to be translated using the set of range registers, and a second portion of the node addresses of the address map of the computing node are to be translated using the TLB.

In one example, the translation logic further includes a TLB update handler to updates to the TLB.

In one example, the memory pool includes system management memory, private memory, and shared memory.

In one example, the first interface uses a shared memory link protocol.

In one example, the shared memory link protocol utilizes physical layer logic of a different interconnect protocol.

In one example, the different interconnect protocol includes a Peripheral Component Interconnect Express (PCIe)-based protocol.

In one example, the first shared memory controller further includes a second interface to couple to another shared memory controller in the plurality of shared memory controllers.

In one example, the second interface uses an expanded version of the shared memory link protocol, and the expanded version of the shared memory link protocol enables routing of requests between shared memory controllers in the plurality of shared memory controllers.

One or more embodiments may provide a system that includes a memory including a plurality of memory elements, a shared memory controller to manage access to a subset of the plurality of memory elements, and at least one computing node connected to the shared memory controller by a shared memory link. The computing node can generate a request relating to a particular line of the memory, the request indicating a first address according to a memory map of the computing node that corresponds to the particular line of the memory, and send the request to the shared memory controller. The shared memory controller can include address translation logic to translate the first address into a corresponding second address according to a global address map of the memory using an address translation structure maintained at the shared memory controller, and routing logic to determine which of a plurality of shared memory controllers is associated with the second address in the global address map.

In one example, the system includes the plurality of shared memory controllers and a plurality of computing nodes, and each shared memory controller is coupled to at least one respective computing node in the plurality of computing nodes.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
   a network controller and a shared memory controller;
   one or more central processing unit (CPU) nodes coupled to the shared memory controller;
   an interface to support multiple layered protocol stacks including a memory access protocol stack and a Peripheral Component Interconnect Express, PCIe, protocol stack, wherein:
     the interface includes a first layer, a second layer and a third layer including a physical layer;
     the physical layer includes an electrical sub-block and a logical sub-block, shared by the memory access protocol stack and the PCIe protocol stack is to physically transmit information to external devices, and
     the interface further includes:
       a transmitter to transmit data to the external devices over a link, wherein a link aggregates multiple lanes,
       a receiver to receive data from the external device over the link, wherein a lane represents a differential signal pair for transmission and a differential signal pair for reception; and
       separate sets of pins for implementing the memory access protocol stack and the PCIe protocol stack.

2. The apparatus of claim 1, further comprising:
   address translation logic to translate an address value referenced by a CPU node in a memory access request to a global address value in a pooled memory domain.

3. The apparatus of claim 2, further comprising:
   internal routing logic to facilitate routing of a memory access request via the memory access protocol stack to local memory elements coupled to the shared memory controller in instances where the address translation logic indicates that the shared memory controller has direct access to a particular global address value associated with the local memory elements; and global address routing logic to determine, from the global address value, that a the memory access request is to be routed to a remote shared memory controller coupled to a remote memory element associated with the global address value.

4. The apparatus of claim 1, further comprising:
a multiplexer coupled to the electrical sub-block to transmit and receive information in accordance with the memory access protocol stack or the PCIe protocol stack.

5. The apparatus of claim 1 wherein the logical sub-block is to prepare outgoing information for transmission by the electrical sub-block.

6. The apparatus of claim 5, wherein the outgoing information comprising an error detection code associated with a flit.

7. The apparatus of claim 6, wherein the error detection code is a cyclic redundancy code (CRC) value.

8. The apparatus of claim 7, wherein the error detection code is a 16-bit CRC value.

9. The apparatus of claim 8, wherein the CPU nodes comprise a first CPU node and a second CPU node, wherein the first and second CPU nodes are operable as independent nodes under control of a virtual machine monitor.

10. The apparatus of claim 1, wherein the memory access protocol stack is a coherent memory access protocol stack.

11. The apparatus of claim 10, further comprising a first set of transmission paths to transmit serial data in accordance with the memory access protocol stack and a second set of transmission paths to transmit serial data in accordance with the PCIe protocol stack.

12. The apparatus of claim 11, wherein the first set of transmission paths and the second set of transmission paths comprise respective copper lines.

13. A system comprising:
a first device; and
a second device coupled to the first device through an interface, wherein the second device comprises:
a network controller and a shared memory controller;
one or more central processing unit (CPU) nodes coupled to the shared memory controller; and
the interface, wherein the interface is to support multiple layered protocol stacks including a memory access protocol stack and a Peripheral Component Interconnect Express, PCIe, protocol stack, wherein:
the interface includes a first layer, a second layer and a third layer including a physical layer;
the physical layer includes an electrical sub-block and a logical sub-block, shared by the memory access protocol stack and the PCIe protocol stack is to physically transmit information to external devices, and
the interface further includes:
a transmitter to transmit data to the external devices over a link, wherein a link aggregates multiple lanes,
a receiver to receive data from the external device over the link, wherein a lane represents a differential signal pair for transmission and a differential signal pair for reception; and
separate sets of pins for implementing the memory access protocol stack and the PCIe protocol stack.

* * * * *